United States Patent
Ozaki

(10) Patent No.: US 12,023,284 B2
(45) Date of Patent: Jul. 2, 2024

(54) MOVING BODY

(71) Applicant: Honda Motor Co., Ltd., Tokyo (JP)

(72) Inventor: Kazumasa Ozaki, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 595 days.

(21) Appl. No.: 17/340,109

(22) Filed: Jun. 7, 2021

(65) Prior Publication Data

US 2021/0401639 A1    Dec. 30, 2021

(30) Foreign Application Priority Data

Jun. 24, 2020    (JP) ................. 2020-108547

(51) Int. Cl.
*A61G 5/04*    (2013.01)
*A61G 5/10*    (2006.01)

(52) U.S. Cl.
CPC .......... *A61G 5/043* (2013.01); *A61G 5/1059* (2013.01); *A61G 5/1089* (2016.11); *A61G 2203/42* (2013.01)

(58) Field of Classification Search
CPC .... A61G 5/043; A61G 5/1059; A61G 5/1089; A61G 2203/42; B60L 2200/16; B60L 2200/34; B60L 2260/34; B60L 15/20; Y02T 10/64; Y02T 10/72; B62D 61/10; B62D 63/02; B62J 1/04; B62J 1/06; B62J 1/08; B62K 1/00; B62K 11/007; B62H 1/12
See application file for complete search history.

(56) References Cited

U.S. PATENT DOCUMENTS

| 7,316,282 B2* | 1/2008 | Mulhern ................ A61G 5/043 |
| | | 180/907 |
| 8,985,249 B2 | 3/2015 | Shirokura et al. |
| 10,137,042 B2* | 11/2018 | Ishikawa .................. A61G 5/04 |
| 10,905,607 B2* | 2/2021 | Moore ...................... A61G 5/06 |
| 2019/0201257 A1* | 7/2019 | Conrad ................ B62K 11/007 |
| 2021/0197918 A1* | 7/2021 | Goto .................... B62K 11/007 |
| 2021/0371037 A1* | 12/2021 | Ozaki ................. B60L 15/2036 |

FOREIGN PATENT DOCUMENTS

| JP | 2009101788 | 5/2009 |
| JP | 2013129415 | 7/2013 |
| JP | 2013237335 | 11/2013 |
| JP | 2015093651 | 5/2015 |
| WO | 2010061498 | 6/2010 |
| WO | 2019244444 | 12/2019 |

* cited by examiner

*Primary Examiner* — Kevin Hurley
*Assistant Examiner* — Marlon A Arce
(74) *Attorney, Agent, or Firm* — JCIPRNET

(57) ABSTRACT

Provided is a moving body. A control device of the moving body starts a first control processing that moves a movement part so that a posture of a base with respect to a passenger seat becomes a predetermined posture with an auxiliary grounding part lowered and grounded. The control device starts a second control processing that lifts the auxiliary grounding part with respect to the base and a third control processing that moves the movement part 2 so as to stabilize a posture of the passenger seat after a delay from the start of the first control processing.

8 Claims, 13 Drawing Sheets

MOVING BODY

CROSS-REFERENCE TO RELATED APPLICATIONS

This application claims the priority benefit of Japan Application No. 2020-108547, filed on Jun. 24, 2020. The entirety of the above-mentioned patent application is hereby incorporated by reference herein and made a part of this specification.

BACKGROUND

Technical Field

The disclosure relates to a moving body including a passenger seat inclinable with respect to a floor.

Related Art

Conventionally, for example, as seen in Patent Documents 1 to 5, there is known a moving body that includes a movement part movable on a floor and a passenger seat inclinable with respect to the floor and that performs movement control of the movement part according to a passenger's manipulation operation or the like while stabilizing the posture of the passenger seat. In this kind of moving body, for example, as seen in Patent Documents 1 and 2, there is known one in which the passenger seat is configured to be able to be lifted and lowered, and in a state such as during a stop in which the passenger seat is lowered, the passenger seat may be supported in a fixed posture by grounding an auxiliary grounding part such as multiple auxiliary wheels connected to the passenger seat to the floor.

Patent Documents

[Patent Document 1] WO 2019/244444
[Patent Document 2] Japanese Patent Laid-open No. 2009-101788
[Patent Document 3] WO 2010/061498
[Patent Document 4] Japanese Patent Laid-open No. 2013-237335
[Patent Document 5] Japanese Patent Laid-open No. 2015-093651

By the way, in the moving body seen in Patent Document 1, the passenger seat is attached to a base assembled to the movement part so as to be elastically swingable with respect to the base. In this kind of moving body, the base may tilt with respect to the passenger seat with the auxiliary grounding part and the movement part grounded.

In such a case, when the movement control of the movement part capable of stabilizing the posture of the passenger seat and lifting of the passenger seat (and lifting of the auxiliary grounding part) are started in order to start movement of the moving body, even if the passenger does not perform a manipulation operation for moving the moving body immediately after the auxiliary grounding part rises from the floor, there is a risk that the movement part may make oversensitive movement in an attempt to eliminate tilt of the base with respect to the passenger seat.

The disclosure provides a moving body performing movement control of a movement part so as to stabilize the posture of a passenger seat. In the moving body, when the auxiliary grounding part is lifted from the floor, the auxiliary grounding part is able to be smoothly lifted while oversensitive movement of the movement part is suppressed.

SUMMARY

A moving body of the disclosure includes: a movement part movable on a floor; a base assembled to the movement part so as to be inclinable with respect to the floor; a passenger seat attached to the base so as to be elastically swingable with respect to the base; an auxiliary grounding part, connected to the passenger seat so as to be able to be lifted and lowered with respect to the base, and connected to the passenger seat so that a ground load supporting the passenger seat acts from the floor with the auxiliary grounding part lowered to a predetermined position with respect to the base, and the ground load is eliminated according to lifting of the passenger seat from the predetermined position with respect to the base; a moving actuator generating a driving force that moves the movement part; a lifting actuator generating a driving force that lifts and lowers the auxiliary grounding part with respect to the base; and a control device, having a function of controlling movement of the movement part via the moving actuator and a function of controlling lifting and lowering of the auxiliary grounding part with respect to the base via the lifting actuator. The control device is configured to, when starting movement control of the movement part, start a first control processing that moves the movement part by the moving actuator so that a posture of the base with respect to the passenger seat becomes a predetermined posture with the auxiliary grounding part lowered to the predetermined position, and then start a second control processing that lifts the auxiliary grounding part with respect to the base by the lifting actuator and a third control processing that moves the movement part by the moving actuator so as to stabilize a posture of the passenger seat after a delay from the start of the first control processing.

DESCRIPTION OF THE EMBODIMENTS

Figure 1:
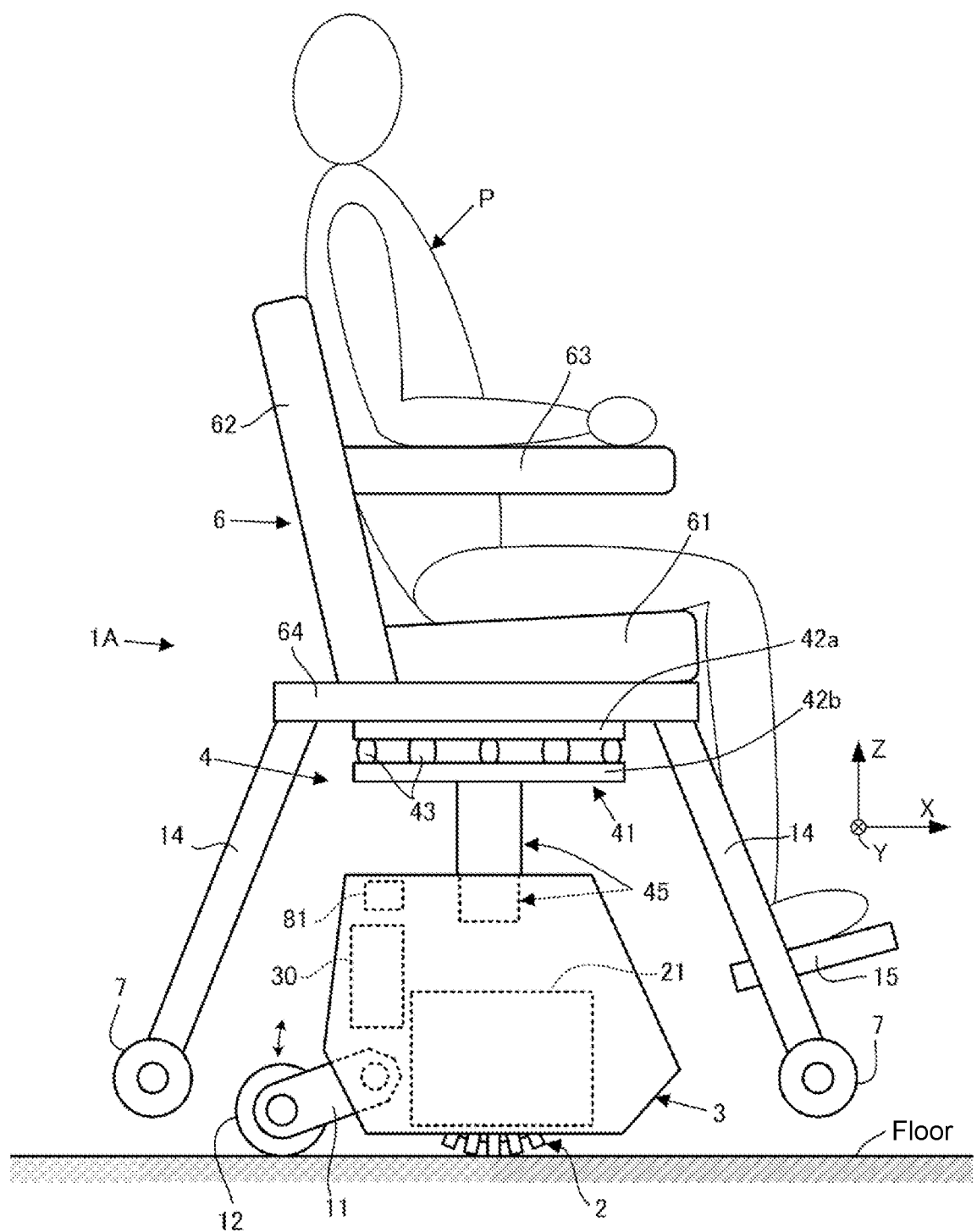
FIG. 1 is a side view showing a moving body of a first embodiment of the disclosure in an auxiliary wheel non-grounded state.

A moving body of the disclosure includes: a movement part movable on a floor; a base assembled to the movement part so as to be inclinable with respect to the floor; a passenger seat attached to the base so as to be elastically swingable with respect to the base; an auxiliary grounding part, connected to the passenger seat so as to be able to be lifted and lowered with respect to the base, and connected to the passenger seat so that a ground load supporting the passenger seat acts from the floor with the auxiliary grounding part lowered to a predetermined position with respect to the base, and the ground load is eliminated according to lifting of the passenger seat from the predetermined position with respect to the base; a moving actuator generating a driving force that moves the movement part; a lifting actuator generating a driving force that lifts and lowers the auxiliary grounding part with respect to the base; and a control device, having a function of controlling movement of the movement part via the moving actuator and a function of controlling lifting and lowering of the auxiliary grounding part with respect to the base via the lifting actuator. The control device is configured to, when starting movement control of the movement part, start a first control processing that moves the movement part by the moving actuator so that a posture of the base with respect to the passenger seat becomes a predetermined posture with the auxiliary grounding part lowered to the predetermined position, and then start a second control processing that lifts the auxiliary grounding part with respect to the base by the lifting actuator and a third control processing that moves the movement part by the moving actuator so as to stabilize a posture of the passenger seat after a delay from the start of the first control processing (first aspect).

Moreover, in the disclosure, the description that a passenger seat is "elastically swingable with respect to a base" means that the passenger seat is swingable with respect to the base so that a restoring force in a direction of returning a posture of the passenger seat with respect to the base to a reference posture is generated according to a swing amount of the passenger seat (with respect to the base). In addition, the term "floor" in the disclosure is not limited to the floor in the usual sense, and may include a road surface, the ground or the like.

According to the first aspect of the disclosure, with the auxiliary grounding part lowered to the predetermined position (with the ground load acting on the auxiliary grounding part from the floor), the control device executes the first control processing, before executing the second control processing that lifts the auxiliary grounding part with respect to the base by the lifting actuator.

Accordingly, with the auxiliary grounding part lowered to the predetermined position, by elastic swing of the passenger seat with respect to the base, even if the posture of the base with respect to the passenger seat tilts from a predetermined posture (reference posture), the base is able to be returned to the predetermined posture while the auxiliary grounding part remains lowered to the predetermined position.

After that, the second control processing that lifts the auxiliary grounding part with respect to the base by the lifting actuator and the third control processing that moves the movement part by the moving actuator so as to stabilize the posture of the passenger seat are executed by the control device. Hence, according to the first aspect of the disclosure, it is possible to smoothly lift the auxiliary grounding part while suppressing oversensitive movement of the movement part.

In addition, in the disclosure, as a control method for moving the movement part so as to stabilize the posture of the passenger seat, for example, a control device performing movement control of the movement part so as to balance an overall center of gravity of the moving body including the passenger in the same manner as a mass point of an inverted pendulum may be adopted. However, other control methods are also able to be adopted as long as the posture of the passenger seat is able to be stabilized.

In the disclosure, the auxiliary grounding part may be connected to the passenger seat either in a manner to have a section (hereinafter referred to as "play") in which vertical movement of the auxiliary grounding part is not transmitted to the passenger seat, or in a manner to have no such play. If the auxiliary grounding part is connected to the passenger seat so as to have the play, a behavior of the posture of the passenger seat is the same as a behavior in a case where the auxiliary grounding part is fixed while being pressed against an upper end of the play.

Therefore, in the description of the disclosure, in the moving body in which the auxiliary grounding part is provided with the play, it is considered that the auxiliary grounding part is pressed against the upper end of the play, unless otherwise specified. Therefore, in the moving body in which the auxiliary grounding part is provided with the play, the description that the auxiliary grounding part is lifted or lowered with respect to the base by the lifting actuator means that the auxiliary grounding part is relatively moved with respect to the base so as to be lifted or lowered with respect to the base in the case where the auxiliary grounding part is considered to be pressed against the upper end of the play. In addition, the "predetermined position" of the auxiliary grounding part means a predetermined relative position of the auxiliary grounding part with respect to the base in the state in which the auxiliary grounding part is considered to be pressed against the upper end of the play.

In the first aspect of the disclosure, the control device is preferably configured to execute the third control processing so as to gradually increase an absolute value of a control gain in the third control processing (second aspect).

According to this, immediately after the start of lifting of the auxiliary grounding part by the lifting actuator, it is possible to prevent the movement part from moving oversensitively in order to stabilize the posture of the passenger seat. Thus, it is possible to smoothly lift the auxiliary grounding part with respect to the base.

In the first or second aspect of the disclosure, the third control processing may be a control that moves the movement part so that a velocity of the overall center of gravity of the moving body and an inclination angle of the base approach their respective target values. In this case, the control device is preferably configured to, when executing the second control processing and the third control processing, set the target value of the velocity of the overall center of gravity to zero and execute the third control processing until lifting of the passenger seat with respect to the base is completed (third aspect).

According to this, after the start of the third control processing, until lifting of the passenger seat with respect to the base is completed, movement of the movement part is suppressed, and the movement part is maintained in a movement stopped state or a similar state. Hence, it is possible to smoothly lift the auxiliary grounding part with respect to the base.

In the first to third aspects of the disclosure, the control device is preferably configured to, when ending the movement control of the movement part, execute a fourth control processing that lowers the auxiliary grounding part to the predetermined position with respect to the base by the lifting actuator while executing the third control processing, and gradually reduce the absolute value of the control gain in the third control processing before the auxiliary grounding part is lowered to the predetermined position with respect to the base by the lifting actuator (fourth aspect).

According to this, when the auxiliary grounding part is lowered with respect to the base by the fourth control processing, it is possible to suppress oversensitive movement of the movement part in association with approaching of the auxiliary grounding part to the predetermined position. Hence, the auxiliary grounding part is smoothly lowered to the predetermined position with respect to the base, and thus, it is possible to smoothly realize a state in which the passenger seat is supported by the ground load received by the auxiliary grounding part from the floor.

First Embodiment

Figure 2:
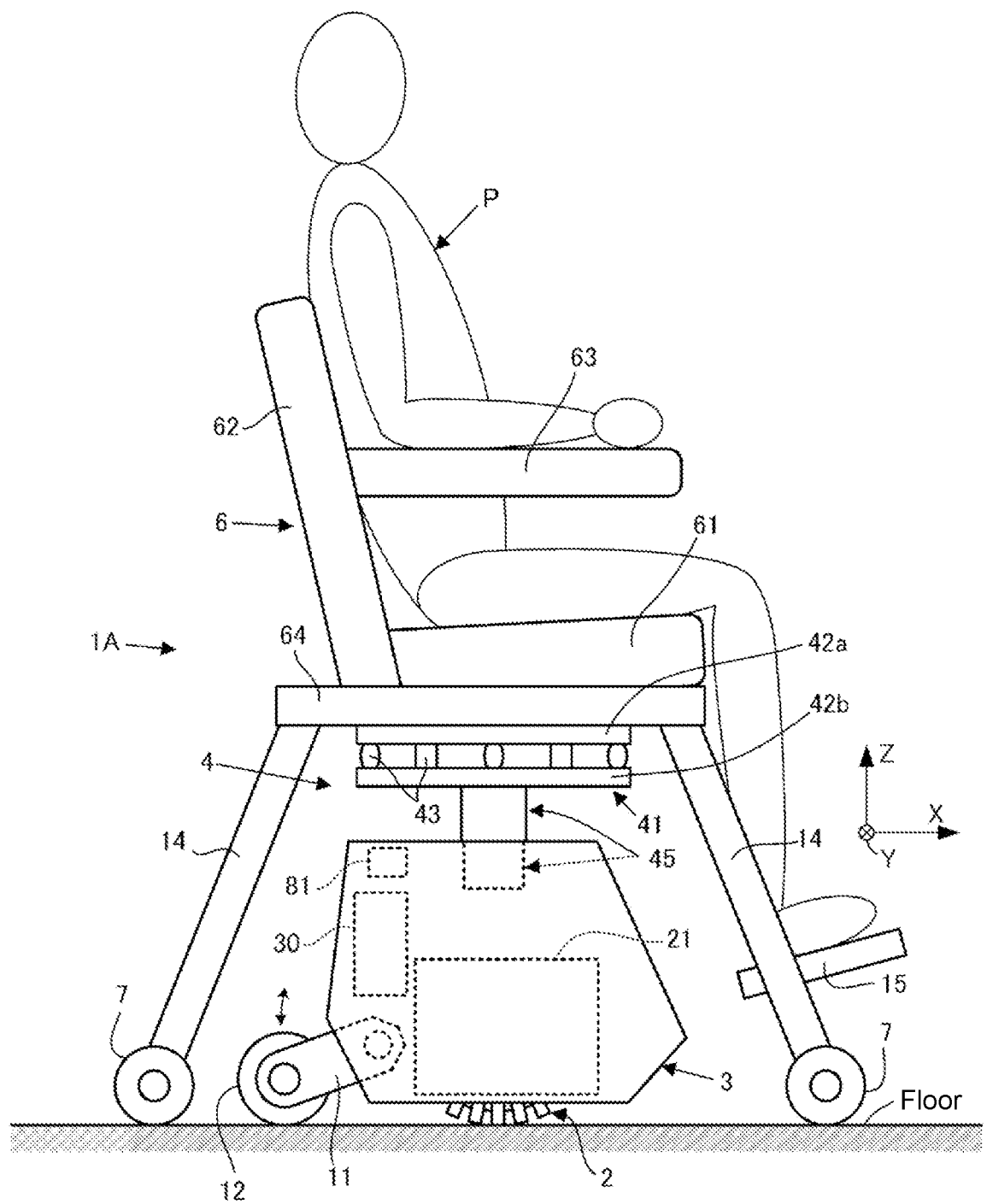
FIG. 2 is a side view showing the moving body of the first embodiment of the disclosure in an auxiliary wheel grounded state.

A first embodiment of the disclosure is described below with reference to FIG. 1 to FIG. 10C. Referring to FIG. 1 and FIG. 2, a moving body 1A of the present embodiment is an inverted pendulum type moving body including: a movement part 2, movable in all directions on a floor; a base 3, assembled to the movement part 2; a passenger seat 6, attached to the base 3 via a connecting mechanism 4; and an auxiliary grounding part 7, connected to the passenger seat 6.

The movement part 2 has a known structure in the present embodiment. For example, one having a structure described in Patent Document 5 or the like may be adopted as the movement part 2. In this case, the movement part 2 has a roughly wheel-like shape in appearance, and is driven by a driving mechanism 21 so as to be movable in all directions on the floor.

As described in, for example, Patent Document 5, the driving mechanism 21 includes two moving actuators 22a and 22b (shown in FIG. 4) composed of electric motors or the like, and is able to move the movement part 2 in any direction on the floor by transmitting power from the moving actuators 22a and 22b to the movement part 2.

However, the movement part 2 and the driving mechanism 21 are not limited to those having the above structures, and may have other structures.

In the following description, as shown in FIG. 1 or FIG. 2, a three-axis orthogonal coordinate system Cs is assumed in which a front-rear direction of the moving body 1A is an X-axis direction, a left-right direction of the moving body 1A is a Y-axis direction, and an up-down direction (vertical direction or substantially vertical direction) is a Z-axis direction. Unless otherwise specified, the X-axis direction, the Y-axis direction, and the Z-axis direction mean the respective coordinate axis directions in the three-axis orthogonal coordinate system Cs. In other words, the X-axis direction is a direction of movement due to rolling of the wheel-like movement part 2 standing on the floor, and the Y-axis direction is a direction of an axle (rotating shaft of the movement part 2 during rolling) of the wheel-like movement part 2.

In the description of the present embodiment, a positive direction of the X-axis is the front direction of the moving body 1A, a positive direction of the Y-axis is the left direction of the moving body 1A, and a positive direction of the Z-axis is the upward direction. A direction about the X-axis, a direction about the Y-axis, and a direction about the Z-axis are referred to as a roll direction, a pitch direction, and a yaw direction, respectively.

The base 3 is assembled to the movement part 2 so as to cover an upper side of the movement part 2. The driving mechanism 21 is mounted on the base 3. In this case, the base 3 is assembled to the movement part 2 so as to be relatively rotatable with respect to the movement part 2 about the axis of the axle of the wheel-like movement part 2. Accordingly, the base 3 is able to be inclined with respect to the floor in the pitch direction (direction about the Y-axis) with the movement part 2 grounded to the floor.

Further, the base 3 is assembled to the movement part 2, so that when the wheel-like movement part 2 tilts with respect to the floor, the base 3 tilts with respect to the floor together with the movement part 2. Accordingly, the base 3 is able to be inclined with respect to the floor in the roll direction (direction about the X-axis).

A tail wheel 12 is connected to a rear part of the base 3 via a link 11. The link 11 extends rearward from the base 3, and the tail wheel 12 is axially supported at a rear end of the link 11 so as to be rotatable about a rotation axis in the Y-axis direction. In addition, a front end of the link 11 is axially supported so as to be swingable with respect to the base 3 in the pitch direction. Hence, the tail wheel 12 is grounded to the floor by its own weight behind the movement part 2.

When the movement part 2 of the moving body 1A advances, the tail wheel 12 rolls on the floor in an advancement direction so as to follow the movement part 2 in a driven manner. When the movement part 2 is moved in the left-right direction (Y-axis direction), the movement part 2 turns around a grounding part or its vicinity of the tail wheel 12. Accordingly, the moving body 1A may perform a turning motion.

The tail wheel 12 may be energized in a direction of being pressed against the floor by a spring. In addition, the tail wheel 12 is not only able to move in the driven manner in the X-axis direction, but may be configured to be movable in the Y-axis direction by an actuator such as an electric motor, as seen in, for example, Japanese Patent Laid-Open No. 2013-129415 or U.S. Pat. No. 8,985,249.

In the present embodiment, the passenger seat 6 is a seat-like boarding part including a seating part 61, a backrest 62 and an armrest 63. As shown in FIG. 1 and FIG. 2, a passenger P may board the passenger seat 6 by seating themselves on the seating part 61 like sitting on a chair. The passenger seat 6 is disposed above the base 3. A frame 64 (hereinafter seat frame 64) fixed to a bottom of the seating part 61 of the passenger seat 6 is connected to the base 3 via the connecting mechanism 4 interposed between the frame 64 and the base 3.

The connecting mechanism 4 is basically configured so that the passenger seat 6 is able to be inclined together with the base 3 as the base 3 is inclined. In addition, the connecting mechanism 4 is configured so that the passenger seat 6 is elastically swingable with respect to the base 3 and that the passenger seat 6 is able to be relatively lifted and lowered with respect to the base 3.

Figure 3:
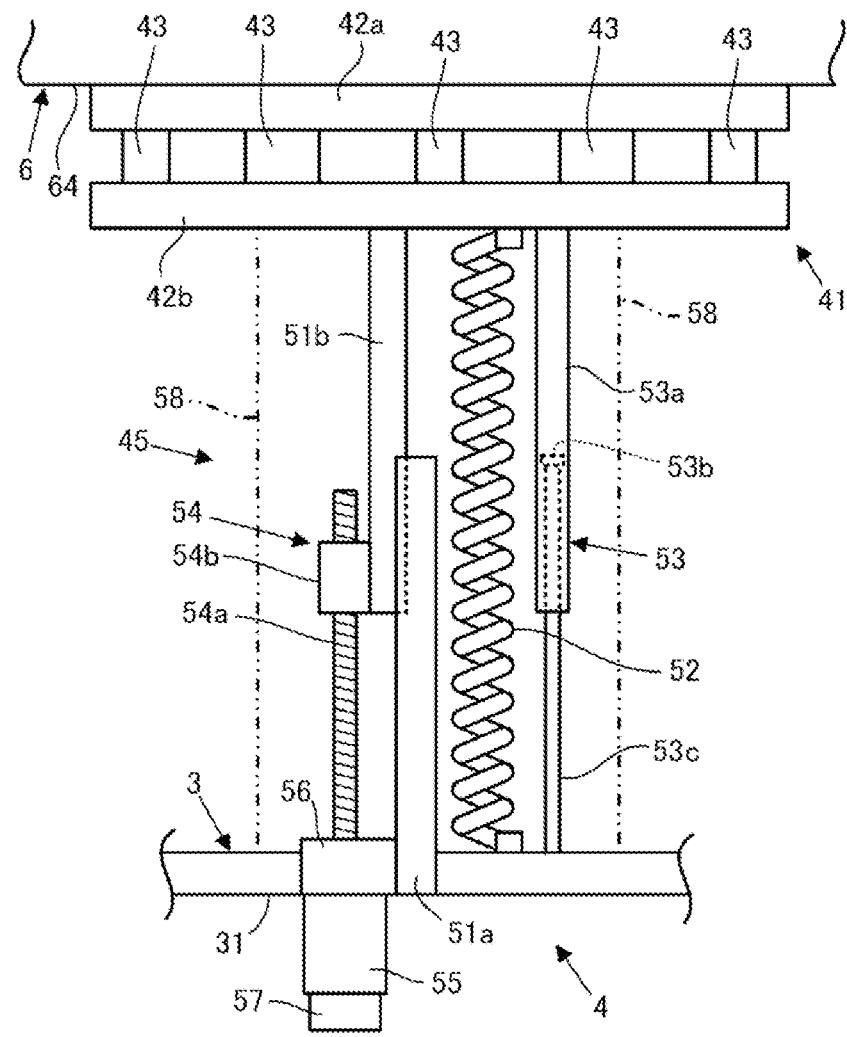
FIG. 3 is a side view showing a connecting mechanism provided in the moving body of the first embodiment.

The connecting mechanism 4 may be configured, for example, as illustrated in FIG. 3. The connecting mechanism 4 includes an elastic structure 41 for enabling elastic swing of the passenger seat 6 with respect to the base 3, and a lifting mechanism 45 for enabling relative lifting and lowering of the passenger seat 6 with respect to the base 3.

In the present embodiment, the elastic structure 41 is composed of a pair of plates 42a and 42b arranged vertically side by side with a space therebetween, and multiple elastic members 43 interposed between the plate 42a and the plate 42b. The elastic members 43 are composed of elastic materials such as rubber bushes or springs, and are arranged so as to be individually elastically deformable according to a load acting between the plate 42a and the plate 42b. Accordingly, the space and tilt between the plate 42a and the plate 42b may be elastically changed.

The upper plate 42a is fixed to the seat frame 64 of the passenger seat 6, and the lower plate 42b is connected to the base 3 via the lifting mechanism 45. Accordingly, by elastically changing the tilt between the plate 42a and the plate 42b, the passenger seat 6 may become elastically swingable with respect to the base 3.

As the lifting mechanism 45, for example, one having a structure described in a first embodiment of Patent Document 1 may be adopted. In this case, as shown in FIG. 3, the lifting mechanism 45 includes: a first guide member 51a, extending upward from a frame 31 (hereinafter base frame 31) at an upper end of the base 3; a second guide member 51b, extending downward from the lower plate 42b of the elastic structure 41 and slidably engaged with the first guide member 51a in the up-down direction; a coil spring 52 and a damper 53, interposed between the lower plate 42b of the elastic structure 41 and the base frame 31 to be capable of expansion and contraction in the up-down direction; and a lifting actuator 55, outputs a driving force that relatively lifts and lowers the passenger seat 6 with respect to the base 3 via, for example, a ball screw mechanism 54 including a screw part 54a and a nut part 54b.

The lifting actuator 55 is composed of, for example, an electric motor attached to the base frame 31, and its rotating shaft (not shown) is connected to the screw part 54a of the ball screw mechanism 54 via a reducer 56. The screw part 54a extends in the up-down direction laterally to the first guide member 51a. The nut part 54b fitted to the screw part 54a is fixed to the second guide member 51b.

Accordingly, by rotationally driving the screw part 54a of the ball screw mechanism 54 by the lifting actuator 55, the nut part 54b and the second guide member 51b are relatively lifted and lowered with respect to the base 3. As a result, the elastic structure 41 and the passenger seat 6 are relatively lifted and lowered with respect to the base 3.

It is also possible that power transmission from the lifting actuator 55 to the second guide member 51b is performed by a rotation/linear motion conversion mechanism other than the ball screw mechanism 54. It is also possible that the lifting actuator 55 is composed of a linear actuator, and the linear actuator directly moves the second guide member 51b up and down with respect to the first guide member 51a. In addition, the lifting actuator 55 is not limited to an electric actuator, and may be, for example, a hydraulic actuator.

The lifting actuator 55 is equipped with a brake 57 of an electric type that is able to lock the rotating shaft of the lifting actuator 55 from rotating by frictional force or uneven fitting or the like. The brake 57 is configured to be switchable between a state in which the rotating shaft of the lifting actuator 55 is locked (and thus a state in which relative lifting and lowering of the passenger seat 6 with respect to the base 3 are locked; hereinafter locked state) and a state in which the locked state is canceled.

With the axis of the coil spring 52 oriented in the up-down direction, one end (upper end) of the coil spring 52 is coupled to the lower plate 42b of the elastic structure 41 and the other end (lower end) of the coil spring 52 is coupled to the base frame 31. The coil spring 52 extends as the passenger seat 6 and the elastic structure 41 are relatively lifted with respect to the base 3, and this extension causes an elastic force (tensile elastic force) energizing the passenger seat 6 in a direction of approaching the base 3.

The damper 53 includes: a tube 53a, filled with a fluid such as hydraulic oil; a piston 53b, slidable within the tube 53a; and a rod 53c, protruding capable of expansion and contraction from the piston 53b toward one end of the tube 53a. With the axis of the damper 53 oriented in the up-down direction, an end (an end opposite the rod 53c) of the tube 53a is fixed to the lower plate 42b of the elastic structure 41, and a tip of the rod 53c is fixed to the base frame 31.

Accordingly, the rod 53c outside the tube 53a expands and contracts as the passenger seat 6 is lifted and lowered with respect to the base 3. The damper 53 is configured to generate viscous resistance by allowing the fluid in the tube 53a to flow through an orifice (not shown) as the rod 53c expands and contracts.

The vertical relationship between the tube 53a of the damper 53 and the rod 53c outside the tube 53a may be contrary to that described above. The end of the tube 53a may be fixed to the base frame 31, and the tip of the rod 53c may be fixed to the lower plate 42b of the elastic structure 41.

In the present embodiment, the elastic structure 41 and the lifting mechanism 45 constituting the connecting mechanism 4 are configured as above. Moreover, as shown in chain double-dashed lines in FIG. 3, a cover 58 capable of expansion and contraction is interposed between the lower plate 42b of the elastic structure 41 and the base frame 31 to cover around the components (such as the ball screw mechanism 54, the coil spring 52, and the damper 53) of the lifting mechanism 45. In addition, the lifting mechanism 45, for example, may not include the coil spring 52 and the damper 53, or the brake 57.

Referring to FIG. 1 and FIG. 2, in the present embodiment, the auxiliary grounding part 7 is a wheel attached to a lower end of each of multiple legs 14 extending downward from a peripheral edge of the seat frame 64 of the passenger seat 6 and arranged around the base 3. Hereinafter, each auxiliary grounding part 7 will be referred to as an auxiliary wheel 7.

In the present embodiment, the moving body 1A includes, for example, four sets each including one leg 14 and one auxiliary wheel 7. These four sets of legs 14 and auxiliary wheels 7 are disposed in left/right pairs on a front side and a rear side of the passenger seat 6. In FIG. 1 and FIG. 2, only the sets (two sets respectively in the front and rear) of legs 14 and auxiliary wheels 7 on the right side of the moving body 1A are shown, and the sets (two sets respectively in the front and rear) of legs 14 and auxiliary wheels 7 on the left side are located behind the sets of legs 14 and auxiliary wheels 7 on the right side.

Each auxiliary wheel 7 is axially supported at a lower end of each leg 14 so as to be rollable on the floor and revolvable in the yaw direction (direction about the Z-axis) while grounded to the floor. For example, an universal caster may be adopted as each auxiliary wheel 7. Further, each auxiliary wheel 7 is attached to each leg 14 so that braking (braking in a direction of reducing a rolling speed of the auxiliary wheel 7) by frictional force or the like acts during rolling of the auxiliary wheel 7.

In addition, a footrest 15 on which the passenger P seated on the seating part 61 of the passenger seat 6 rests their feet is attached to the left and right legs 14 on the front side of the moving body 1A. The footrest 15 may either be composed separately of a footrest for the left foot and a footrest for the right foot, or be integrally composed.

In the present embodiment, since the auxiliary wheel 7 is attached to the passenger seat 6 via the leg 14 as described above, as the passenger seat 6 is lifted and lowered with respect to the base 3, the auxiliary wheel 7 is lifted and lowered with respect to the base 3 together with the passenger seat 6. Accordingly, the lifting mechanism 45 also functions as a mechanism lifting and lowering the auxiliary wheel 7 with respect to the base 3.

Here, FIG. 1 shows the moving body 1A in a state in which the passenger seat 6 and the auxiliary wheel 7 are lifted to a predetermined lifting position with respect to the base 3. This state is a state (a state in which each auxiliary wheel 7 receives no ground reaction force) in which each auxiliary wheel 7 rises above the floor to which the movement part 2 is grounded, and is hereinafter referred to as an auxiliary wheel non-grounded state.

FIG. 2 shows the moving body 1A in a state in which the passenger seat 6 and the auxiliary wheel 7 are lowered to a predetermined lowering position with respect to the base 3. This state is a state in which the passenger seat 6 is kept in a fixed or almost fixed posture with respect to the floor since the auxiliary wheels 7 on the front, rear, left and right sides of the passenger seat 6 are grounded to the floor while receiving a ground load, and is hereinafter referred to as an auxiliary wheel grounded state.

Moreover, although the movement part 2 is also grounded to the floor in the auxiliary wheel grounded state shown in FIG. 2, it is also possible to put the movement part 2 in a non-grounded state by further lowering the passenger seat 6 and the auxiliary wheel 7 with respect to the base 3 (in other words, by lifting the base 3 with respect to the passenger seat 6 and the auxiliary wheel 7).

Figure 4:
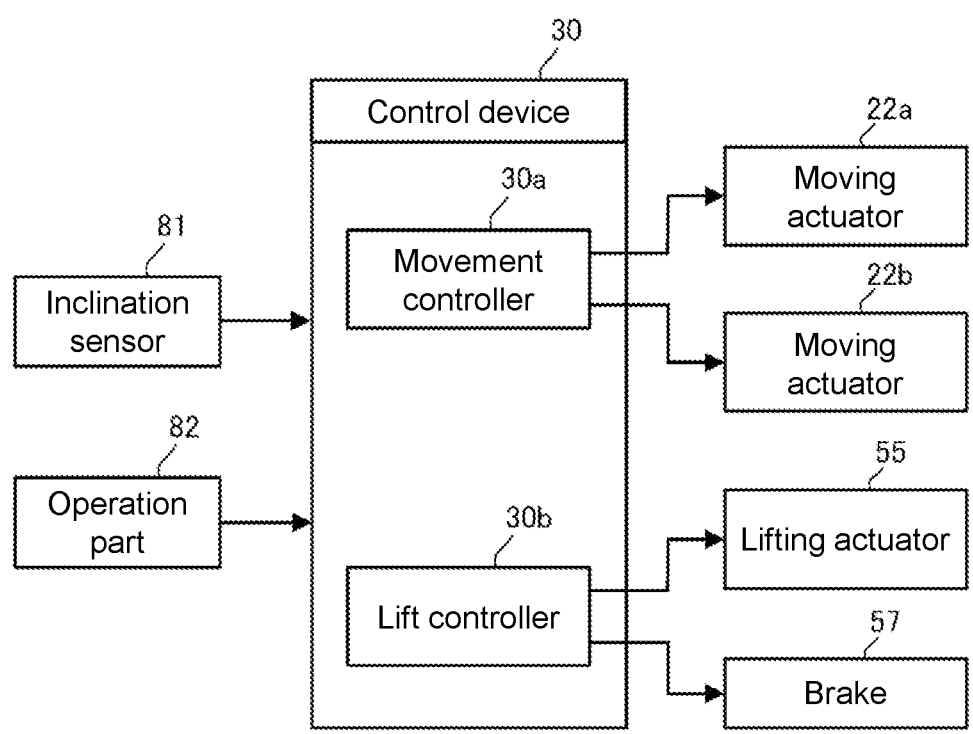
FIG. 4 is a block diagram showing a configuration related to control of the moving body of the first embodiment.

Next, a configuration related to motion control of the moving body 1A will be described. Referring to FIG. 4, the moving body 1A includes a control device 30 having functions of controlling operation of the two moving actuators 22a and 22b that drive the movement part 2 and controlling operation of the lifting actuator 55 and the brake 57 of the lifting mechanism 45, and an inclination sensor 81 for detecting an inclination angle (inclination angle with respect to the vertical direction) of the base 3.

The inclination sensor 81 is composed of, for example, an inertial measurement unit including an acceleration sensor and an angular velocity sensor respectively capable of detecting (three-dimensional) acceleration and angular velocity in three axial directions, and is mounted on the base 3 (see FIG. 1 or FIG. 2). In this case, for example, by executing measurement calculation processing such as a strapdown method with a processor or the like (not shown) attached thereto, the inclination sensor 81 sequentially measures (estimates) the inclination angle of the base 3 in the roll direction (direction about the X-axis) and the inclination angle of the base 3 in the pitch direction (direction about the Y-axis) from the detected values of acceleration and angular velocity, and outputs a detection signal indicating the measured values to the control device 30.

In addition to measuring the inclination angle of the base 3, the inclination sensor 81 also has a function of measuring (estimating) the angular velocity of the base 3 in the yaw direction (direction about the Z-axis), and the inclination sensor 81 also outputs a detection signal indicating the measured value to the control device 30.

The calculation processing for measuring the inclination angle of the base 3 and the angular velocity of the base 3 in the yaw direction from the values of acceleration and angular velocity detected by the acceleration sensor and the angular velocity sensor included in the inclination sensor 81 may also be executed by the control device 30.

The control device 30 is composed of, for example, one or more electronic circuit units including a microcomputer, a memory, an interface circuit, and the like. The control device 30 is input with, in addition to the detection signal of the inclination sensor 81, command information relating to a motion of the moving body 1A from an operation part 82 that is able to be operated by the passenger P.

As the operation part 82, one attached to the armrest 63 of the passenger seat 6 of the moving body 1A or the like, or one able to be carried by the passenger P may be adopted. The operation part 82 that is able to be carried by the passenger P may be, for example, a communication terminal such as a smartphone or a tablet terminal owned by the passenger P. The moving body 1A may include a portion to which the communication terminal owned as the operation part 82 by the passenger P is detachably attached.

The control device 30 includes, as functions realized by one or both of an implemented hardware configuration and an implemented program (software configuration), a movement controller 30a controlling movement of the movement part 2 via the two moving actuators 22a and 22b, and a lift controller 30b controlling operation of the lifting mechanism 45 via the lifting actuator 55 and the brake 57.

Next, a specific control processing of the control device 30 and operation of the moving body 1A will be described. Firstly, movement control of the movement part 2 in the auxiliary wheel non-grounded state will be described with reference to FIG. 5 and FIG. 6.

Movement of the moving body 1A is basically performed in the auxiliary wheel non-grounded state in which the passenger seat 6 and the auxiliary wheel 7 are lifted to the predetermined lifting position with respect to the base 3. In this auxiliary wheel non-grounded state, the brake 57 of the lifting mechanism 45 is controlled to the locked state by the control device 30. Accordingly, the heights of the passenger seat 6 and the auxiliary wheel 7 with respect to the base 3 are kept fixed. Hereinafter, the auxiliary wheel non-grounded state in which the heights of the passenger seat 6 and the auxiliary wheel 7 with respect to the base 3 are kept fixed in this manner is referred to as an auxiliary wheel non-grounded state during normal movement. The heights of the passenger seat 6 and the auxiliary wheel 7 with respect to the base 3 in the auxiliary wheel non-grounded state during normal movement may also be appropriately adjusted within a predetermined range according to the preference of the passenger P or the like.

In the auxiliary wheel non-grounded state during normal movement, by the movement controller 30a, the control device 30 performs movement control of the movement part 2 so as to move the movement part 2 as appropriate while stabilizing the posture of the passenger seat 6. More specifically, in the present embodiment, the movement controller 30a performs movement control of the movement part 2 so as to move the movement part 2 while balancing an overall center of gravity of the moving body 1A including the passenger P boarding (seated on) the passenger seat 6 in the same manner as a mass point of an inverted pendulum.

Here, the balanced state of the overall center of gravity means, more specifically, a state in which dynamic balance is achieved so that in a resultant force of the gravity acting on the overall center of gravity and an inertial force generated by an indicated acceleration (target acceleration determined by the control device 30) of the overall center of gravity, the moment (moment in a direction about a horizontal axis) acting on a ground reaction force center point of a grounding part of the movement part 2 becomes zero or almost zero.

Figure 5:
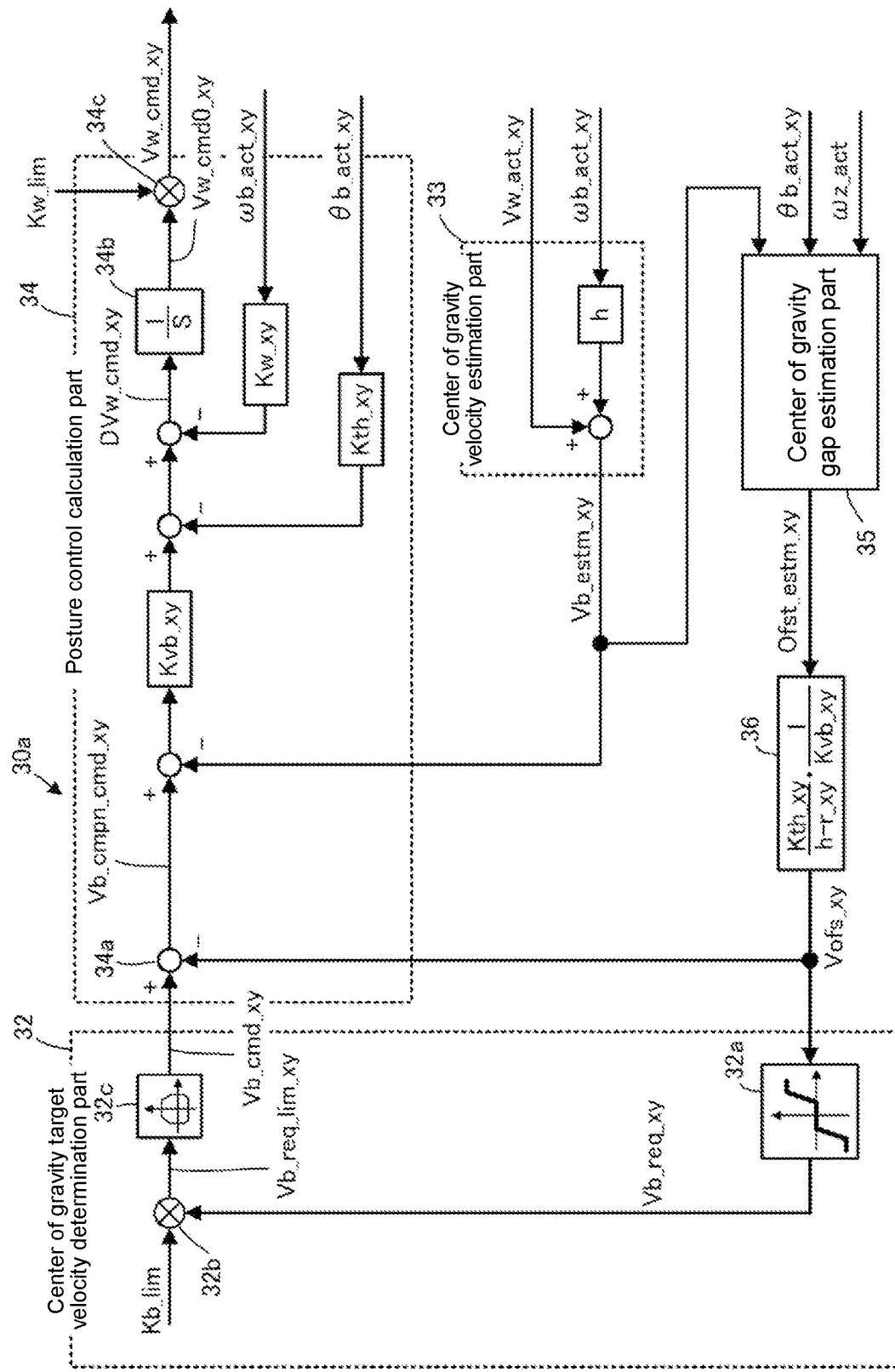
FIG. 5 is a block diagram showing processing of a movement controller shown in FIG. 4.

Specifically, the movement controller 30a sequentially executes control processings shown in the block diagram of FIG. 5 in a predetermined calculation processing cycle. In the following description, regarding reference numerals of state quantities such as velocity and acceleration, a reference numeral to which a subscript "_xy" is added means a set of an X-axis direction component and a Y-axis direction component.

In each calculation processing cycle, the movement controller 30a firstly executes a processing of a center of gravity velocity estimation part 33 shown in FIG. 5. The center of gravity velocity estimation part 33 calculates a center of gravity velocity estimated value Vb_estm_xy by following Equations (1a) and (1b) from, for example, a value of actual translational velocity Vw_act_xy of the movement part 2, a value of actual temporal change rate (inclination angular velocity) ωb_act_xy of an inclination angle θb_xy of the base 3, and a set value of a height h (height from the floor) of the overall center of gravity.

$$Vb\_estm\_x = Vw\_act\_x + h \cdot \omega b\_act\_x \quad (1a)$$

$$Vb\_estm\_y = Vw\_act\_y + h \cdot \omega b\_act\_y \quad (1b)$$

In this case, in the present embodiment, as the values of Vw_act_x and Vw_act_y in the above calculation, a target translational velocity Vw_cmd_xy (previous value) of the movement part 2 determined by a later-described posture control calculation part 34 in the previous calculation processing cycle is used. However, for example, a rotational speed of an output shaft of each of the moving actuators 22a and 22b may be detected, and the latest values of Vw_act_x and Vw_act_y estimated from the detected values may be used in the calculations with Equations (1a) and (1b).

As the values of ωb_act_x and ωb_act_y, in the present embodiment, the latest values of the temporal change rate of measured values of inclination angles θb_x and θb_y of the base 3 measured by the inclination sensor 81, or the latest values of measured values of cob_act_x and cob_act_y are used.

Next, by executing a processing of a center of gravity gap estimation part 35 shown in FIG. 5, the movement controller 30a determines a center of gravity gap estimated value Ofst_estm_xy being an estimated value of a center of gravity gap Ofst_xy. In the following description of the center of gravity gap estimation part 35, center of gravity velocity estimated values Vb_estm_x and Vb_estm_y calculated by the center of gravity velocity estimation part 33 are respectively referred to as a first center of gravity velocity estimated value Vb_estm_x and a first center of gravity velocity estimated value Vb_estm_y.

Here, the center of gravity gap Ofst_xy is the amount of deviation of the overall center of gravity of the moving body 1A from a reference position in a horizontal direction (X-axis direction and Y-axis direction). The reference position of the overall center of gravity corresponds to a position of the overall center of gravity of the moving body 1A in a case where a passenger boarding (seated on) the passenger seat 6 is immovable in a predetermined neutral posture with respect to the passenger seat 6.

Figure 6:
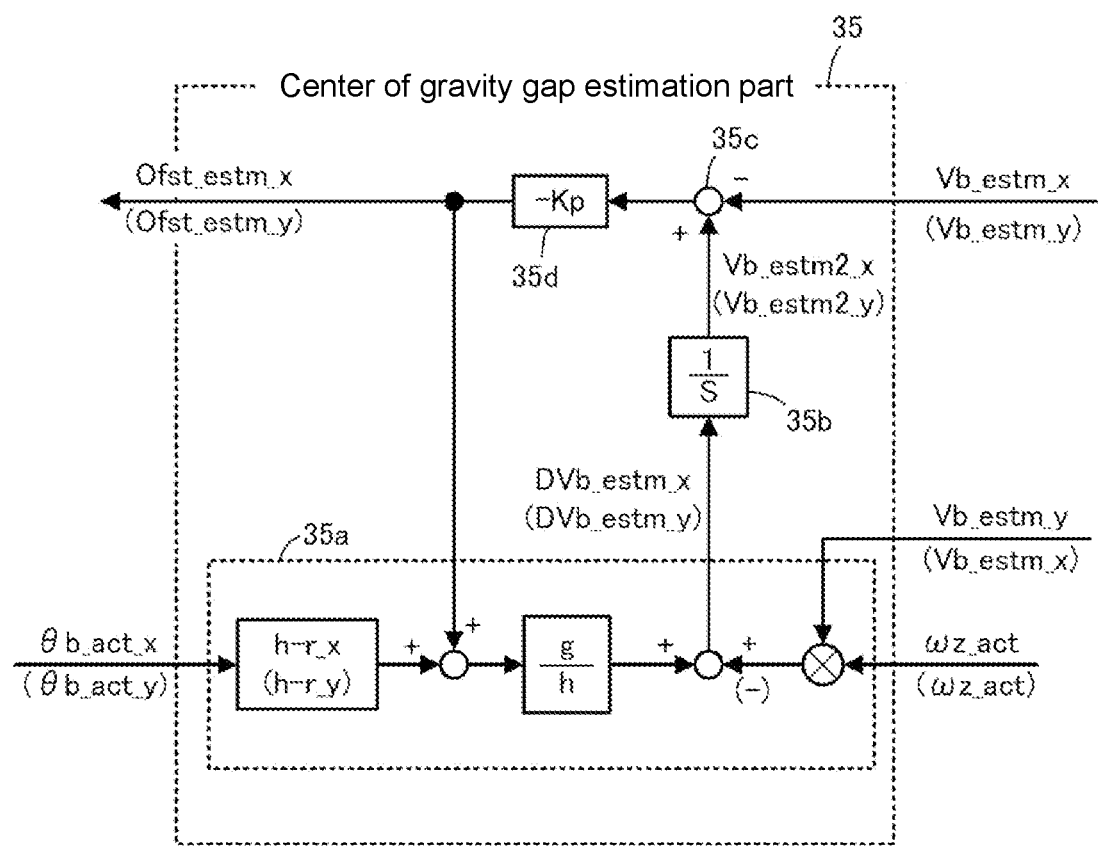
FIG. 6 is a block diagram showing processing of a center of gravity gap estimation part shown in FIG. 5.

The processing of the center of gravity gap estimation part 35 is executed, for example, as shown in the block diagram of FIG. 6. In FIG. 6, in the center of gravity gap estimated value Ofst_estm_xy, a reference numeral of a state quantity relating to a processing for determining a center of gravity gap estimated value Ofst_estm_x in the X-axis direction is written without parentheses, and a reference numeral of a state quantity relating to a processing for determining a center of gravity gap estimated value Ofst_estm_y in the Y-axis direction is written with parentheses. Regarding arithmetic symbols ("+" and "−"), an arithmetic symbol common to both the processing for determining the center of gravity gap estimated value Ofst_estm_x in the X-axis direction and the processing for determining the center of gravity gap estimated value Ofst_estm_y in the Y-axis direction is written without parentheses, and an arithmetic symbol only relating to the processing for determining the center of gravity gap estimated value Ofst_estm_y in the Y-axis direction is written with parentheses.

Specifically, the processing in FIG. 6 is described as follows. The center of gravity gap estimation part 35 executes calculation processing of following Equations (2a) and (2b) in a calculation part 35a using a measured value (latest value) of an inclination angle θb_act_xy and a measured value (latest value) of a yaw rate coz_act measured by the inclination sensor 81, the first center of gravity velocity estimated value Vb_estm_xy (latest value) calculated by the center of gravity velocity estimation part 33, and the center of gravity gap estimated value Ofst_estm_xy (previous value) determined in the previous calculation processing cycle, thereby calculating a translational acceleration estimated value DVb_estm_xy of the overall center of gravity of the moving body 1A.

$$DVb\_estm\_x = (g/h) \cdot (\theta b\_act\_x \cdot (h - r\_x) + Ofst\_estm\_x) + \omega z\_act \cdot Vb\_estm\_y \quad (2a)$$

$$DVb\_estm\_y = (g/h) \cdot (\theta b\_act\_y \cdot (h - r\_y) + Ofst\_estm\_y) - \omega z\_act \cdot Vb\_estm\_x \quad (2b)$$

In Equations (2a) and (2b), g is a gravitational acceleration constant, r_x is a set value of a turning radius of a wheel rollable in the X-axis direction as a model of the movement part 2, and r_y is a set value of a turning radius of a wheel rollable in the Y-axis direction as a model of the movement part 2.

Further, the center of gravity gap estimation part 35 executes a processing for integrating each component (X-axis direction component and Y-axis direction component) of the translational acceleration estimated value DVb_estm_xy in a calculation part 35b, thereby calculating a second center of gravity velocity estimated value Vb_estm2_xy being a second estimated value of the velocity of the overall center of gravity of the moving body 1A.

Next, the center of gravity gap estimation part 35 executes a processing for calculating a deviation of each component between the second center of gravity velocity estimated value Vb_estm2_xy (latest value) and the first center of gravity velocity estimated value Vb_estm_xy (latest value). Further, the center of gravity gap estimation part 35 multiplies each component of the deviation by a gain (−Kp) of a predetermined value in a calculation part 35d, thereby determining a latest value of the center of gravity gap estimated value Ofst_estm_xy.

Next, the movement controller 30a calculates a center of gravity gap influence quantity Vofs_xy by executing a processing of a center of gravity gap influence quantity calculator 36 shown in FIG. 5. In the later-described posture control calculation part 34, the center of gravity gap influence quantity Vofs_xy represents a deviation of an actual velocity with respect to the target velocity of the overall center of gravity when a feedback control is performed without considering deviation of the position of the overall center of gravity of the moving body 1A from the reference position.

The center of gravity gap influence quantity calculator 36 multiplies the newly determined center of gravity gap estimated value Ofst_estm_x in the X-axis direction by a value (Kth_x/(h−r_x))/Kvb_x, thereby calculating a center of gravity gap influence quantity Vofs_x in the X-axis direction. In addition, the center of gravity gap influence quantity calculator 36 multiplies the newly determined center of gravity gap estimated value Ofst_estm_y in the Y-axis direction by a value (Kth_y/(h−r_y))/Kvb_y, thereby calculating a center of gravity gap influence quantity Vofs_y in the Y-axis direction. Kth_x, Kth_y, Kvb_x, and Kvb_y are control gain values used in the processing of the later-described posture control calculation part 34.

Next, by executing a processing of a center of gravity target velocity determination part 32 shown in FIG. 5, the movement controller 30a determines a center of gravity target velocity Vb_cmd_xy for each calculation processing cycle. In this case, the center of gravity target velocity determination part 32 firstly executes a dead band processing and a limit processing on the center of gravity gap influence quantity Vofs_xy (latest value) determined by the center of gravity gap influence quantity calculator 36 in a processing part 32a, thereby determining a center of gravity velocity required value Vb_req as a required value of a translational velocity of the overall center of gravity.

Here, in the present embodiment, when intending to move (translational movement or turning movement) the moving body 1A in a desired direction, the passenger P performs a weight shift motion such as tilting their upper body so as to move the overall center of gravity in the desired direction. In the present embodiment, the weight shift motion has a meaning as a manipulation operation for moving the moving body 1A. Therefore, the center of gravity target velocity determination part 32 determines the center of gravity velocity required value Vb_req from the center of gravity gap influence quantity Vofs_xy (latest value) by the processing part 32a.

Specifically, in the processing part 32a, if the center of gravity gap influence quantity Vofs_x in the X-axis direction has a value (value relatively close to zero) within a dead band being a predetermined range near zero, a center of gravity velocity required value Vb_req_x in the X-axis direction is set to zero.

If the center of gravity gap influence quantity Vofs_x in the X-axis direction has a value deviating from the dead band, the center of gravity velocity required value Vb_req_x in the X-axis direction has the same polarity as Vofs_x, and its magnitude (absolute value) is determined so as to increase as the amount of deviation of Vofs_x from the dead band increases. However, the center of gravity velocity required value Vb_req_x in the X-axis direction is limited within a range between a predetermined upper limit value (>0) and a predetermined lower limit value (≤0). A processing for determining a center of gravity velocity required value Vb_req_y in the Y-axis direction is the same as that described above.

Next, the center of gravity target velocity determination part 32 multiplies each component of a center of gravity velocity required value Vb_req_xy by a center of gravity velocity limit coefficient Kb_lim in a calculation part 32b, thereby calculating an after-limitation center of gravity velocity required value Vb_req_lim_xy.

Here, in the auxiliary wheel non-grounded state during normal movement of the moving body 1A, the value of the center of gravity velocity limit coefficient Kb_lim is set to "1". Accordingly, the center of gravity velocity required value Vb_req_xy is determined as it is as the after-limitation center of gravity velocity required value Vb_req_lim_xy.

The center of gravity target velocity determination part 32 further executes a processing of a processing part 32c. In the processing part 32c, a limit processing for determining the center of gravity target velocity Vb_cmd_xy (a set of Vb_cmd_x and Vb_cmd_y) that limits a combination of after-limitation center of gravity velocity required values Vb_req_lim_x and Vb_req_lim_y is executed so as to prevent the rotational speeds of the output shafts of the moving actuators 22a and 22b from deviating from a predetermined allowable range.

In this case, if the set of after-limitation center of gravity velocity required values Vb_req_lim_x and Vb_req_lim_y is within a predetermined area on a coordinate system with the value of Vb_req_lim_x as the vertical axis and the value of Vb_req_lim_y as the horizontal axis, the set of after-limitation center of gravity velocity required values Vb_req_lim_x and Vb_req_lim_y is determined as it is as the center of gravity target velocity Vb_cmd_xy.

If the set of after-limitation center of gravity velocity required values Vb_req_lim_x and Vb_req_lim_y deviates from the predetermined area on the above coordinate system, that limited to a set on a boundary of the predetermined area is determined as the center of gravity target velocity Vb_cmd_xy.

As described above, in the present embodiment, the center of gravity target velocity Vb_cmd_xy is determined according to the center of gravity gap influence quantity Vofs_xy (or the center of gravity gap Ofst_xy). In addition, a setting operation or an increase/decrease operation may be performed on the center of gravity target velocity Vb_cmd_xy depending on an operation of the operation part 82. For example, a velocity obtained by synthesizing (adding) a required value of the velocity of the overall center of gravity set by the passenger P according to the operation of the operation part 82 and a required value of the velocity of the overall center of gravity set according to the center of gravity gap influence quantity Vofs_xy (or the center of gravity gap Ofst_xy) may be determined as the center of gravity velocity required value Vb_req_xy. Alternatively, the required value of the velocity of the overall center of gravity set by the passenger P according to the operation of the operation part 82 may be determined as it is as the center of gravity velocity required value Vb_req_xy. The center of gravity velocity required value Vb_req_xy determined in this manner may be subjected to the above processings of the calculation part 32b and the processing part 32c to determine the center of gravity target velocity Vb_cmd_xy.

After executing the processing of the center of gravity target velocity determination part 32 as above, the movement controller 30a next performs the processing of the posture control calculation part 34 shown in FIG. 5. The posture control calculation part 34 determines the target translational velocity Vw_cmd_xy of the movement part 2 so as to stabilize the posture of the passenger seat 6 (so as to balance the overall center of gravity of the moving body 1A).

More specifically, the posture control calculation part 34 firstly subtracts each component of the center of gravity gap influence quantity Vofs_xy from each component of the center of gravity target velocity Vb_cmd_xy in a calculation part 34a, thereby determining an after-center-of-gravity-gap-compensation target velocity Vb_cmpn_cmd_xy.

Next, by the processing of calculation parts excluding the calculation part 34a and a calculation part 34b performing an integration operation, the posture control calculation part 34 calculates, by following Equations (3a) and (3b) respectively, a target translational acceleration DVw_cmd_x in the X-axis direction and a target translational acceleration DVw_cmd_y in the Y-axis direction in a target translational acceleration DVw_cmd_xy being a target value of the translational acceleration of the movement part 2.

$$DVw\_cmd\_x = Kvb\_x \cdot (Vb\_cmpn\_cmd\_x - Vb\_\text{estm}\_x) - Kth\_x \cdot \theta b\_act\_x - Kw\_x \cdot \omega b\_act\_x \quad (3a)$$

$$DVw\_cmd\_y = Kvb\_y \cdot (Vb\_cmpn\_cmd\_y - Vb\_\text{estm}\_y) - Kth\_y \cdot \theta b\_act\_y - Kw\_y \cdot \omega b\_act\_y \quad (3b)$$

In the auxiliary wheel non-grounded state during normal movement of the moving body 1A, Kvb_xy, Kth_xy and Kw_xy in Equations (3a) and (3b) are control gains of predetermined values set in advance. The first term on the right side of Equation (3a) is a feedback manipulated variable component corresponding to a deviation between an after-center-of-gravity-gap-compensation target velocity Vb_cmpn_cmd_x (latest value) of the overall center of gravity of the moving body 1A in the X-axis direction and the center of gravity velocity estimated value Vb_estm_x (latest value) in the X-axis direction calculated by the center of gravity velocity estimation part 33. The second term is a feedback manipulated variable component corresponding to a measured value (latest value) of an actual inclination angle $\theta b\_act\_x$ of the passenger seat 6 in the pitch direction (direction about the Y-axis). The third term is a feedback manipulated variable component corresponding to a measured value (latest value) of an actual inclination angular velocity cob_act_x of the passenger seat 6 in the pitch direction. The target translational acceleration DVw_cmd_x in the X-axis direction is calculated as a synthesized manipulated variable of these feedback manipulated variable components.

Similarly, the first term on the right side of Equation (4b) is a feedback manipulated variable component corresponding to a deviation between an after-center-of-gravity-gap-compensation target velocity Vb_cmpn_cmd_y (latest value) of the overall center of gravity of the moving body 1A in the Y-axis direction and the center of gravity velocity estimated value Vb_estm_y (latest value) in the Y-axis direction calculated by the center of gravity velocity estimation part 33. The second term is a feedback manipulated variable component corresponding to a measured value (latest value) of an actual inclination angle $\theta b\_act\_y$ of the passenger seat 6 in the roll direction (direction about the X-axis). The third term is a feedback manipulated variable component corresponding to a measured value (latest value) of an actual inclination angular velocity cob_act_y of the passenger seat 6 in the roll direction. The target translational acceleration DVw_cmd_y in the Y-axis direction is calculated as a synthesized manipulated variable of these feedback manipulated variable components.

Equations (3a) and (3b) are able to be rewritten into following Equations (3a)' and (3b)', respectively.

$$DVw\_cmd\_x = Kvb\_x \cdot (Vb\_cmd\_x - Vb\_\text{estm}\_x) - Kth\_x \cdot (Ofst\_\text{estm}\_x/(h-r\_x) + \theta b\_act\_x) - Kw\_x \cdot \omega b\_act\_x \quad (3a)'$$

$$DVw\_cmd\_y = Kvb\_y \cdot (Vb\_cmd\_y - Vb\_\text{estm}\_y) - Kth\_y \cdot (Ofst\_\text{estm}\_y/(h-r\_y) + \theta b\_act\_y) - Kw\_y \cdot \omega b\_act\_y \quad (3b)'$$

In this case, the second term on the right side of Equation (3a)' has a meaning as a feedback manipulated variable component for making an actual position of the overall center of gravity of the moving body 1A in the X-axis direction directly above the grounding part of the movement part 2 when the moving body 1A is viewed from the Y-axis direction. The second term on the right side of Equation (3b)' has a meaning as a feedback manipulated variable component for making the actual position of the overall center of gravity of the moving body 1A in the Y-axis direction directly above the grounding part of the movement part 2 when the moving body 1A is viewed from the X-axis direction.

Next, by integrating each component of the target translational acceleration DVw_cmd_xy in the calculation part 34b, the posture control calculation part 34 calculates a basic value Vw_cmd0_xy of the target translational velocity of the movement part 2. Further, the posture control calculation part 34 multiplies each component of the basic value Vw_cmd0_xy by a velocity limit coefficient Kw_lim for appropriately limiting a moving velocity of the movement part 2 in a calculation part 34c, thereby determining the target translational velocity Vw_cmd_xy (latest value) of the movement part 2.

Here, in the auxiliary wheel non-grounded state during normal movement of the moving body 1A, the value of the velocity limit coefficient Kw_lim is set to "1". Accordingly, the basic value Vw_cmd0_xy is determined as it is as the target translational velocity Vw_cmd_xy.

In the auxiliary wheel non-grounded state during normal movement of the moving body 1A, the movement controller 30a executes a processing for determining the target translational velocity Vw_cmd_xy of the movement part 2 as above in each calculation processing cycle. By this processing, while the posture of the passenger seat 6 of the moving body 1A is kept stable, the target translational velocity Vw_cmd_xy of the movement part 2 is sequentially determined so that an actual center of gravity velocity of the moving body 1A follows the center of gravity target velocity Vb_cmd_xy.

The movement controller 30a controls operation of the moving actuators 22a and 22b so as to realize the target translational velocity Vw_cmd_xy. Specifically, based on correlation data (such as maps and arithmetic expressions) created in advance to define a relationship between the translational velocity of the movement part 2 in the X-axis direction and the Y-axis direction and the rotational speed of the output shaft of each of the moving actuators 22a and 22b, the movement controller 30a determines a target rotational speed of the output shaft of each of the moving actuators 22a and 22b corresponding to the target translational velocity Vw_cmd_xy.

By executing a known speed control on each of the moving actuators 22a and 22b according to the target rotational speed, the rotational speed of the output shaft of each of the moving actuators 22a and 22b is controlled to the target rotational speed. Accordingly, the movement control of the movement part 2 is performed so as to realize the target translational velocity Vw_cmd_xy.

The movement control of the movement part 2 in the auxiliary wheel non-grounded state during normal movement of the moving body 1A is executed as above. Accordingly, by the passenger P shifting weight by moving their upper body or the like, the movement part 2 moves. For example, when the passenger P shifts weight forward, the movement part 2 moves forward (the moving body 1A advances). For example, when the passenger P shifts weight in a lateral direction (Y-axis direction), the movement part 2 moves in the Y-axis direction, and the moving body 1A performs a turning motion with the grounding part or its vicinity of the tail wheel 12 as a fulcrum.

Next, operation in the case of lifting the passenger seat 6 and the auxiliary wheel 7 with respect to the base 3 when movement of the moving body 1A is started is described with reference to FIG. 7 and FIG. 8A to FIG. 8C. In the present embodiment, the passenger P boards (is seated on) the passenger seat 6 in the auxiliary wheel grounded state. By the passenger P (or their attendant) performing a predetermined operation (hereinafter lifting operation) for lifting the passenger seat 6 and the auxiliary wheel 7 with respect to the base 3 by the operation part 82, the control device 30 executes control processings of the movement controller 30a and the lift controller 30b as described below.

Figure 7:
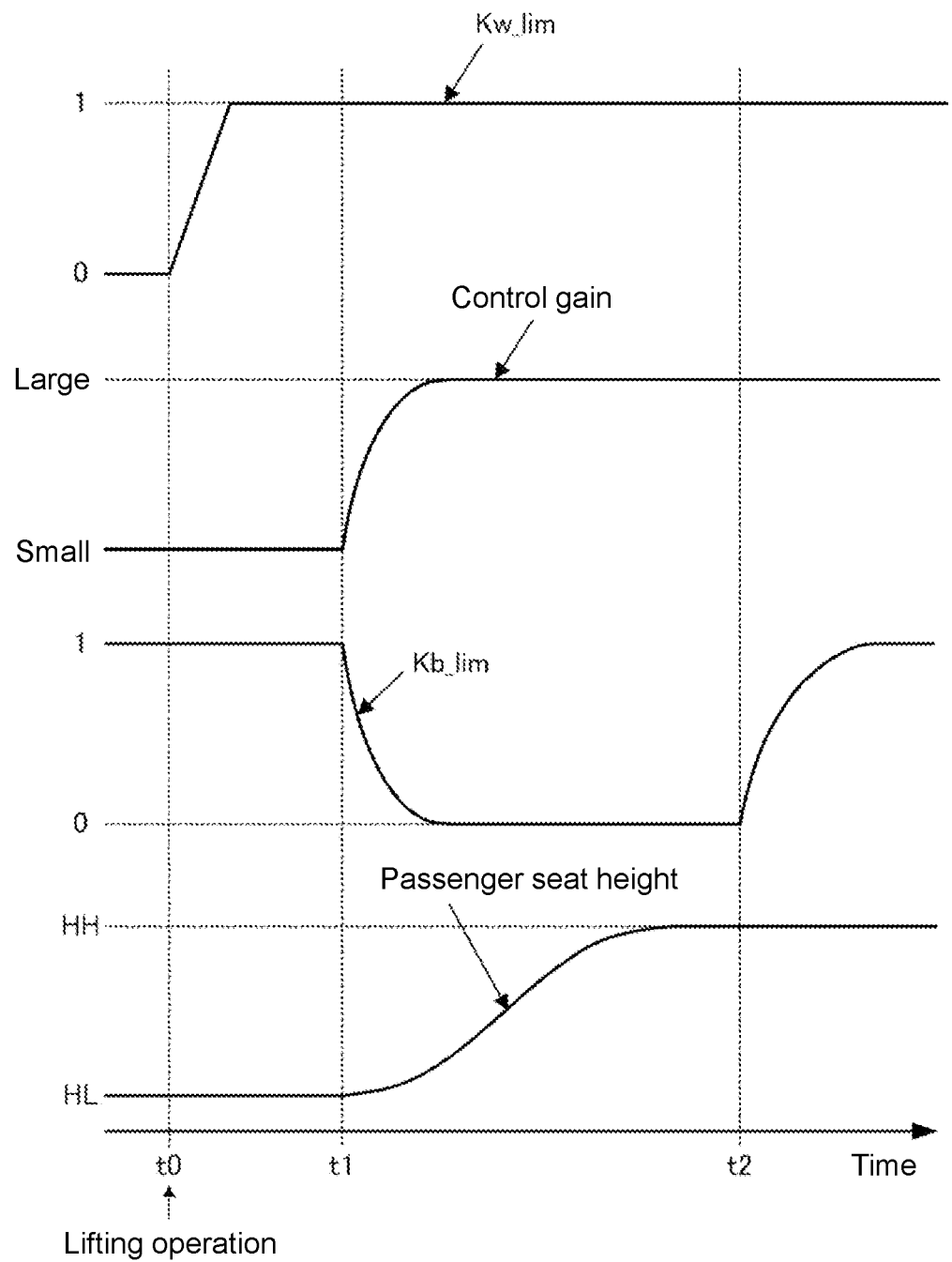
FIG. 7 is a timing chart relating to operation at the time of lifting an auxiliary grounding part of the moving body of the first embodiment.

When the passenger P (or their attendant) performs the lifting operation, firstly, while a height of the passenger seat 6 with respect to the base 3 is maintained at a height HL in the auxiliary wheel grounded state in which the auxiliary wheel 7 and the movement part 2 are grounded, a first control processing of the movement controller 30a is executed (from time t0 to time t1 in FIG. 7).

If the movement part 2 is lifted above the floor in the auxiliary wheel grounded state, until the movement part 2 is grounded to the floor together with the auxiliary wheel 7 (until the height of the passenger seat 6 with respect to the base 3 reaches the height HL), the base 3 is lowered with respect to the passenger seat 6 and the auxiliary wheel 7. After that, the first control processing of the movement controller 30a is started while the height of the passenger seat 6 with respect to the base 3 is maintained at the height HL.

The first control processing is performed similarly to the auxiliary wheel non-grounded state during normal movement of the moving body 1A. However, in this case, as shown in a first section of the graph of FIG. 7, the velocity limit coefficient Kw_lim related to the processing of the posture control calculation part 34 is increased from "0" to "1" immediately after the lifting operation, and is further maintained at "1". As shown in a second section of the graph of FIG. 7, each of the control gains Kvb_xy, Kth_xy, and Kw_xy related to the processing of the posture control calculation part 34 is set to have an absolute value of a predetermined value (relatively close to zero) smaller than that in the auxiliary wheel non-grounded state during normal movement. Apart from this, the control processing is the same as the control processing of the movement controller 30a in the auxiliary wheel non-grounded state during normal movement of the moving body 1A.

Figure 8A:
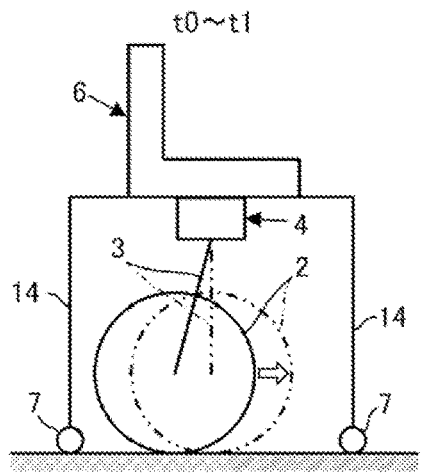
FIG. 8A to FIG. 8C schematically illustrate an operation state of the moving body of the first embodiment at the time of lifting the auxiliary grounding part of the moving body.

FIG. 8A schematically illustrates a motion of the moving body 1A during a period (from time t0 to time t1) in which the first control processing of the movement controller 30a is executed in this manner. As shown in the figure, at the start of execution of the first control processing in the auxiliary wheel grounded state in which the auxiliary wheel 7 and the movement part 2 are grounded, if the base 3 tilts with respect to the passenger seat 6 due to elastic deformation of the elastic structure 41 (if the base 3 tilts so that the grounding part of the movement part 2 deviates from a position directly under the passenger seat 6), the movement part 2 moves so that the tilt of the base 3 is eliminated (so that the grounding part of the movement part 2 reaches the position directly under the passenger seat 6).

In this case, since each of the control gains Kvb_xy, Kth_xy, and Kw_xy is set to have an absolute value (relatively close to zero) smaller than that in the auxiliary wheel non-grounded state during normal movement, quick movement of the movement part 2 is suppressed. Thus, the movement part 2 is moved so that the tilt of the base 3 with respect to the passenger seat 6 is smoothly eliminated.

In the present embodiment, the first control processing by the movement controller 30a is executed until a predetermined time set in advance has elapsed (until time t1 in FIG. 7) from when the lifting operation is performed. However, for example, the inclination angle of the base 3 with respect to the passenger seat 6 is detected using an appropriate sensor, and the first control processing may be executed until the inclination angle substantially matches a predetermined value (until the tilt of the base 3 with respect to the passenger seat 6 is eliminated).

Next, the control device 30 executes the control processing (second control processing) of the lift controller 30b and the control processing (third control processing) of the movement controller 30a in parallel (from time t1 to time t2 in FIG. 7). In this case, in the second control processing of the lift controller 30b, as shown in a fourth section of the graph of FIG. 7, the lift controller 30b controls operation of the lifting actuator 55 so that the height of the passenger seat 6 with respect to the base 3 is gradually increased from the height HL in the auxiliary wheel grounded state in which the auxiliary wheel 7 and the movement part 2 are grounded to a height HH in the auxiliary wheel non-grounded state during normal movement.

The third control processing of the movement controller 30a is performed similarly to the auxiliary wheel non-grounded state during normal movement of the moving body 1A. However, in this case, the value of each of the control gains Kvb_xy, Kth_xy, and Kw_xy is set so that, at the beginning of the lifting motion of the passenger seat 6 (immediately after time t1), the absolute value of each of the control gains Kvb_xy, Kth_xy, and Kw_xy related to the processing of the posture control calculation part 34 is gradually increased from the value in the first control processing to the value in the auxiliary wheel non-grounded state during normal movement, as shown in the second section of the graph of FIG. 7.

Further, as shown in a third section of the graph of FIG. 7, the center of gravity velocity limit coefficient Kb_lim related to the processing of the center of gravity target velocity determination part 32 is set so as to gradually reduce from "1" to "0" at the beginning of the lifting motion of the passenger seat 6 (immediately after time W. Apart from this, the control processing is the same as the control processing of the movement controller 30a in the auxiliary wheel non-grounded state during normal movement of the moving body 1A.

By executing the second control processing of the lift controller 30b and the third control processing of the movement controller 30a in this manner, shortly after the auxiliary wheel 7 starts to rise from the floor, the movement control of the movement gain part 2 is started in a state in which the center of gravity target velocity Vb_cmd_xy is set to zero and the control gains Kvb_xy, Kth_xy, and Kw_xy are set to the same values as those in the auxiliary wheel non-grounded state during normal movement.

In this case, before the auxiliary wheel 7 rises from the floor, the tilt of the base 3 with respect to the passenger seat 6 is eliminated by the first control processing by the movement controller 30a. In addition, the absolute values of the control gains Kvb_xy, Kth_xy, and Kw_xy are set so as to gradually increase from small values immediately after the start of the rise of the auxiliary wheel 7 from the floor. In addition, the center of gravity velocity limit coefficient Kb_lim is set so as to reduce to zero immediately after the start of the rise of the auxiliary wheel 7 from the floor.

Figure 8B:
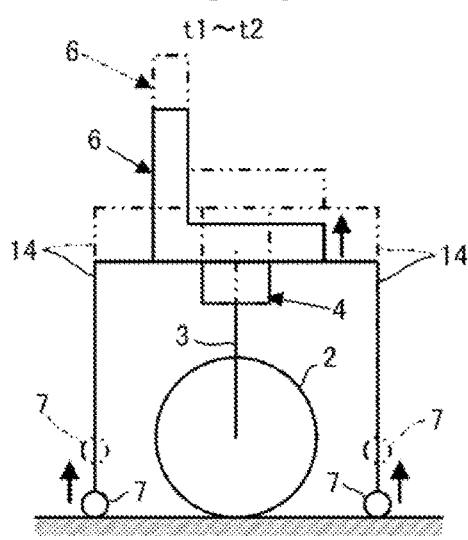

Hence, as schematically illustrated in FIG. 8B, the movement part 2 is maintained in a substantially stopped state, and the passenger seat 6 and the auxiliary wheel 7 are lifted with respect to the base 3 while the base 3 and the passenger seat 6 are maintained in a stable posture.

By the second control processing by the lift controller 30b, when the passenger seat 6 is lifted to the predetermined height HH (height in the auxiliary wheel non-grounded state during normal movement) with respect to the base 3 (time t2 in FIG. 7), the second control processing ends. After that, the lift controller 30b keeps the height of the passenger seat 6 with respect to the base 3 fixed by operating the brake 57 in the locked state.

The movement controller 30a starts the movement control of the movement part 2 in the auxiliary wheel non-grounded state during normal movement. In this case, as shown in the third section of the graph of FIG. 7, immediately after the completion of lifting of the passenger seat 6 (immediately after time t2), the center of gravity velocity limit coefficient Kb_lim related to the processing of the center of gravity target velocity determination part 32 gradually increases from "0" to "1".

Figure 8C:
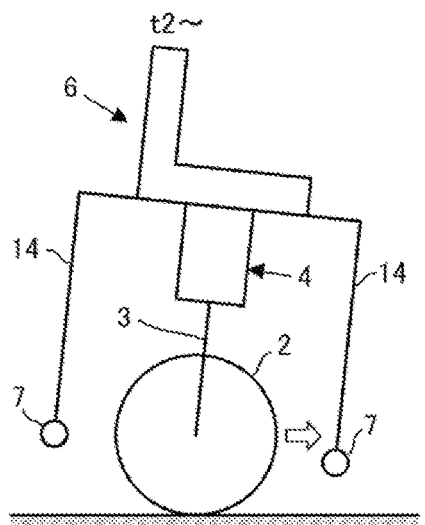

Hence, as illustrated in FIG. 8C, when the base 3 tilts together with the passenger seat 6 according to a weight shift of the passenger P, accordingly, the movement part 2 moves so as to promptly stabilize the posture of the passenger seat 6 (to balance the overall center of gravity).

The control processing of the control device 30 when the passenger seat 6 is lifted with respect to the base 3 is executed as described above. In this case, as described above, after the start of the rise of the auxiliary wheel 7 from the floor, since the movement part 2 is maintained in the substantially stopped state, and the passenger seat 6 and the auxiliary wheel 7 are lifted with respect to the base 3 while the base 3 and the passenger seat 6 are maintained in the stable posture, the passenger seat 6 and the auxiliary wheel 7 are able to be smoothly lifted.

In the present embodiment, the center of gravity velocity limit coefficient Kb_lim related to the processing of the center of gravity target velocity determination part 32 is set to "1" during (period from time t0 to time t1 in FIG. 7) execution of the first control processing of the movement controller 30a. However, for example, the center of gravity velocity limit coefficient Kb_lim may be continuously set to "0" during execution of the first control processing and during execution of the third control processing.

Next, operation in the case of lowering the passenger seat 6 and the auxiliary wheel 7 with respect to the base 3 when movement of the moving body 1A is ended is described with reference to FIG. 9 and FIG. 10A to FIG. 10C. In the present embodiment, when the passenger P gets off from the moving body 1A (gets off from the passenger seat 6), in order to shift an operating state of the moving body 1A from the auxiliary wheel non-grounded state during normal movement to the auxiliary wheel grounded state, the passenger P (or their attendant) performs a predetermined operation (hereinafter lowering operation) for lowering the passenger seat 6 and the auxiliary wheel 7 with respect to the base 3 by the operation part 82, without performing a manipulation to move the movement part 2. According to this, the control device 30 executes the control processings of the movement controller 30a and the lift controller 30b as described below.

When the lowering operation is performed by the passenger P (or their attendant), the control device 30 starts a control processing (fourth control processing) of the lift controller 30b (time t10 in FIG. 9) while continuing to execute the control processing by the movement controller 30a similarly to the auxiliary wheel non-grounded state during normal movement.

Figure 9:
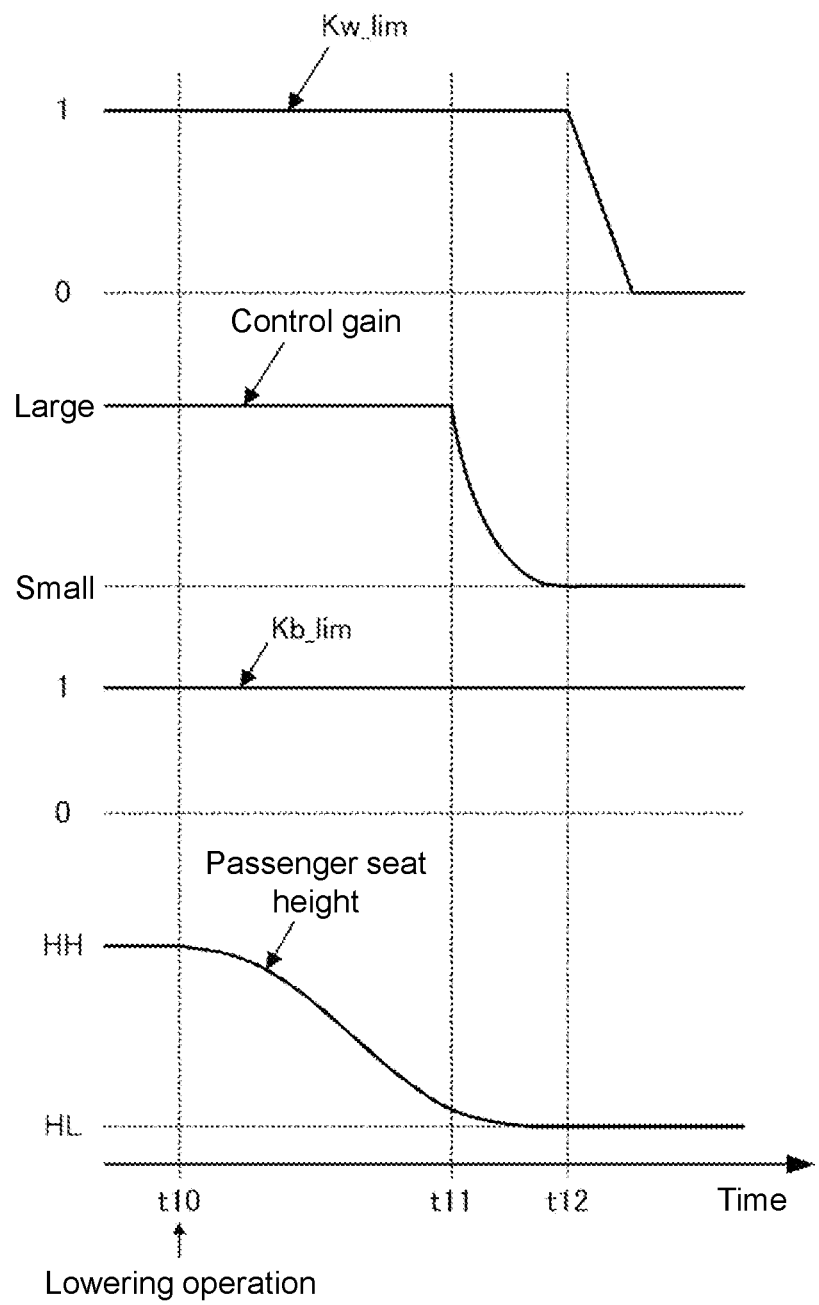
FIG. 9 is a timing chart relating to operation at the time of lowering the auxiliary grounding part of the moving body of the first embodiment.

In this case, in the control processing by the movement controller 30a, each of the control gains Kvb_xy, Kth_xy, and Kw_xy related to the processing of the posture control calculation part 34 is maintained at the same value as that in the auxiliary wheel non-grounded state during normal movement, as shown in a second section of the graph of FIG. 9. The values of the velocity limit coefficient Kw_lim related to the processing of the posture control calculation part 34 and the center of gravity velocity limit coefficient Kb_lim related to the processing of the center of gravity target velocity determination part 32 are maintained to be the same (=1) as those in the auxiliary wheel non-grounded state during normal movement, as shown respectively in a first and third section of the graph of FIG. 9.

In the fourth control processing of the lift controller 30b, as shown in a fourth section of the graph of FIG. 9, the lift controller 30b controls operation of the lifting actuator 55 so that the height of the passenger seat 6 with respect to the base 3 is gradually decreased from the height HH in the auxiliary wheel non-grounded state during normal movement.

Figure 10A:
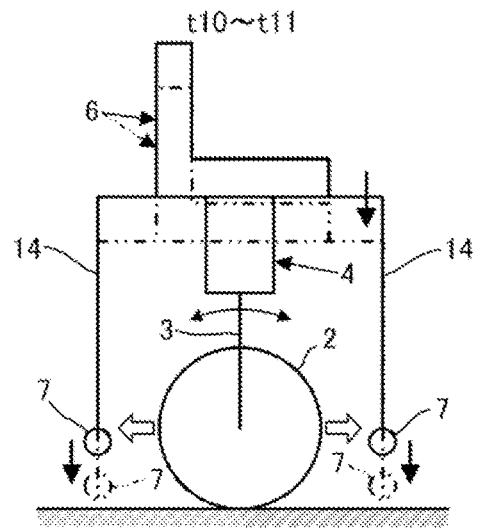
FIG. 10A to FIG. 10C schematically illustrate an operation state of the moving body of the first embodiment at the time of lowering the auxiliary grounding part of the moving body.

Accordingly, as schematically illustrated in FIG. 10A, the passenger seat 6 and the auxiliary wheel 7 are lowered. In this situation, similarly to the auxiliary wheel non-grounded state during normal movement, when a displacement (displacement in the horizontal direction) of the overall center of gravity occurs according to a weight shift of the passenger P, movement of the movement part 2 is promptly performed so as to balance the overall center of gravity.

During lowering of the passenger seat 6, when an elapsed time from the start of the lowering reaches a predetermined time, or when the height of the passenger seat 6 with respect to the base 3 is decreased to a predetermined height (height close to the height HL in the auxiliary wheel grounded state) (time t11 in FIG. 9), while the control processing of the movement controller 30a continues to be executed, the values of the control gains Kvb_xy, Kth_xy, and Kw_xy are set so that the absolute value of each of the control gains Kvb_xy, Kth_xy, and Kw_xy related to the processing of the posture control calculation part 34 is reduced from the value in the auxiliary wheel non-grounded state during normal movement to a relatively small value (relatively close to zero).

Figure 10B:
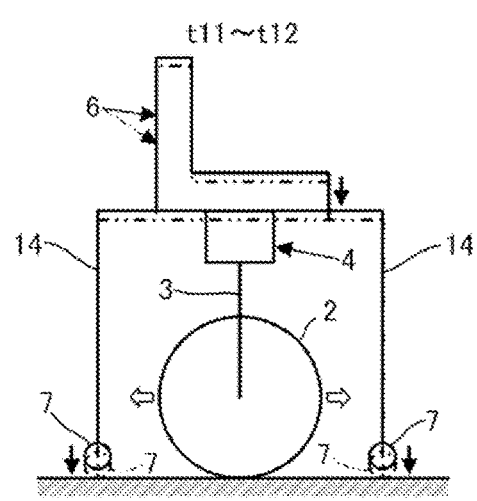

Accordingly, as schematically illustrated in FIG. 10B, with the auxiliary wheel 7 close to the floor, the passenger seat 6 is further lowered while quick movement of the movement part 2 according to the tilt of the base 3 or the like is suppressed.

Next, when the height of the passenger seat 6 with respect to the base 3 is decreased to the height HL in the auxiliary wheel grounded state in which the auxiliary wheel 7 and the movement part 2 are grounded to the floor (time t12 in FIG. 9), the lift controller 30b ends the control processing that lowers the passenger seat 6 with respect to the base 3. In the control processing of the movement controller 30a, the velocity limit coefficient Kw_lim related to the processing of the posture control calculation part 34 is gradually reduced from "1" to "0".

Figure 10C:
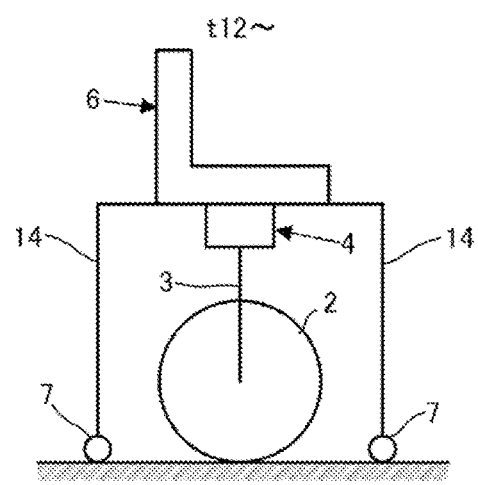

Accordingly, as schematically illustrated in FIG. 10C, in the auxiliary wheel grounded state in which the auxiliary wheel 7 and the movement part 2 are grounded to the floor, movement of the movement part 2 is stopped. In this state, the passenger P is able to easily get off from the moving body 1A.

In the control processing of the lift controller 30b, after reaching the auxiliary wheel grounded state in which the auxiliary wheel 7 is grounded to the floor together with the movement part 2, the base 3 may further be lifted with respect to the passenger seat 6 so as to cause the movement part 2 to rise from the floor.

The control processing of the control device 30 when the passenger seat 6 is lowered with respect to the base 3 is executed as described above. In this case, as described above, immediately before the auxiliary wheel 7 is grounded to the floor, since the absolute value of each of the control gains Kvb_xy, Kth_xy, and Kw_xy is set so as to reduce to a relatively small value (relatively close to zero), the auxiliary wheel 7 is able to be smoothly grounded to the floor while quick movement of the movement part 2 according to the tilt of the base 3 or the like is prevented.

The disclosure is not limited to the first embodiment described above, and other embodiments may also be adopted. Some other embodiments will be illustrated below.

Second Embodiment

Figure 11:
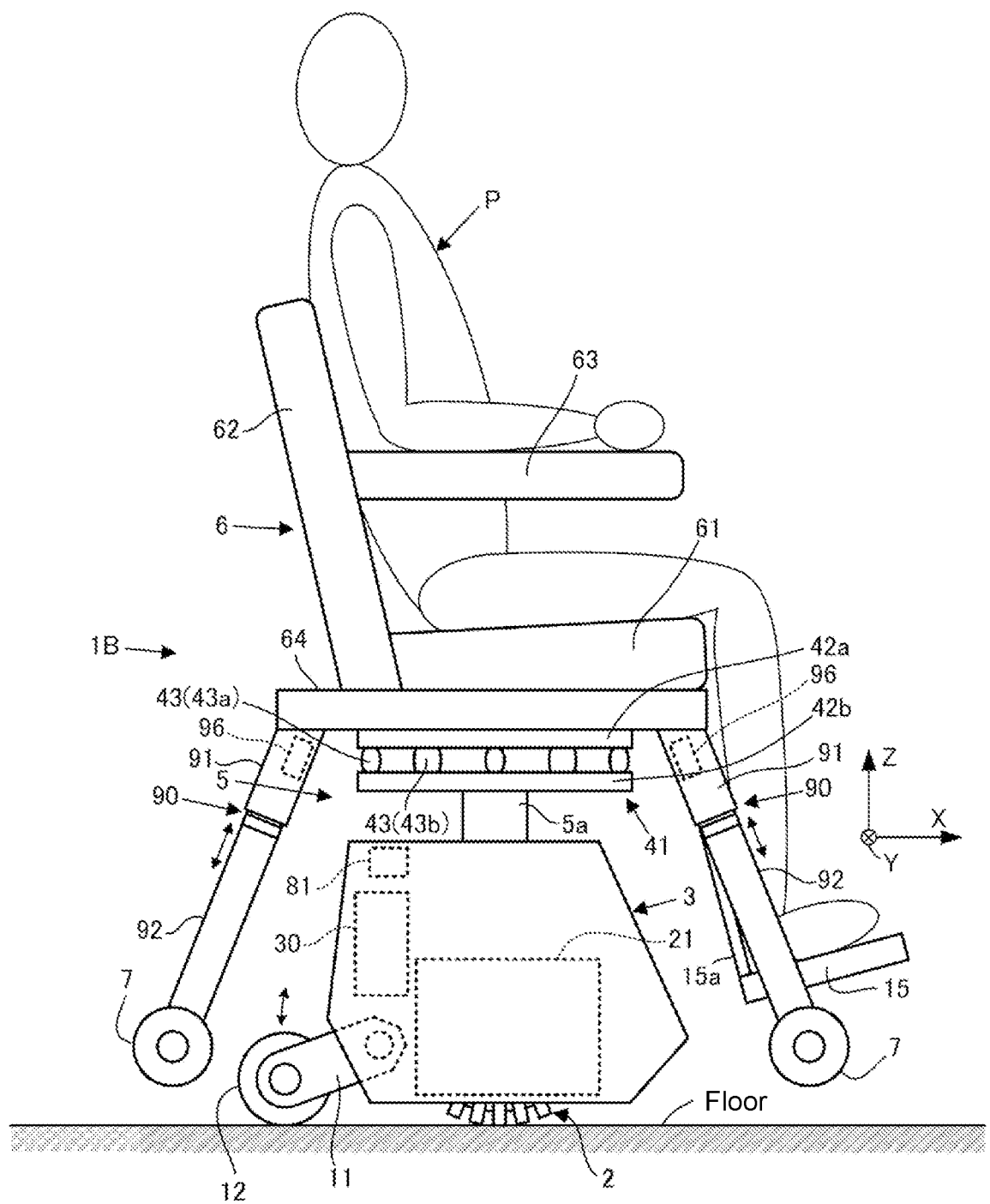
FIG. 11 is a side view showing a moving body of a second embodiment of the disclosure.

In the moving body 1A of the first embodiment, the auxiliary wheel 7 (auxiliary grounding part) may be lifted and lowered with respect to the base 3 together with the passenger seat 6. However, as in a moving body 1B shown in FIG. 11, for example, the auxiliary wheel 7 (auxiliary grounding part) may be lifted and lowered with respect to the passenger seat 6 and the base 3. The moving body 1B has, for example, the same structure as a moving body described in a second embodiment of Patent Document 1. In FIG. 11, the same components as those of the moving body 1A of the first embodiment are denoted by the same reference numerals as those of the moving body 1A.

In the moving body 1B, the passenger seat 6 is connected to the base 3 via a connecting mechanism 5 including the elastic structure 41. In the connecting mechanism 5, the lower plate 42b of the elastic structure 41 is fixed to the base 3 via a connecting member 5a (or directly). Accordingly, although the passenger seat 6 is swingably connected to the base 3 via the elastic structure 41, the passenger seat 6 is unable to be lifted and lowered with respect to the base 3.

Each auxiliary wheel 7 as the auxiliary grounding part is connected to the passenger seat 6 via each of multiple (in the same number as the auxiliary wheel 7) leg mechanisms 90 extending obliquely downward from the seat frame 64 of the passenger seat 6 around the base 3 and capable of expansion and contraction. Each leg mechanism 90 includes an upper leg 91 in a tubular shape whose upper end is fixed to the seat frame 64, and a lower leg 92 whose upper part is slidably inserted into the upper leg 91.

In this case, each leg mechanism 90 is able to expand and contract by sliding the lower leg 92 with respect to the upper leg 91 by a lifting actuator 96 such as an electric motor mounted on the upper leg 91. Similarly to the first embodiment, each auxiliary wheel 7 is axially supported at a lower end of the lower leg 92 so as to be rollable on the floor and revolvable in the yaw direction. The footrest 15 is connected to the upper leg 91 of the left and right leg mechanisms 90 on the front side of the passenger seat 6 via an appropriate connecting member 15a.

The configuration of the moving body 1B of the present embodiment is the same as that of the moving body 1A of the first embodiment except for the matters described above. In the moving body 1B, the control device 30 controls expansion and contraction of each leg mechanism 90 via the lifting actuator 96 corresponding to each leg mechanism 90, instead of controlling operation of the lifting mechanism 45 as in the first embodiment. In this case, the expansion and contraction of each leg mechanism 90 are controlled so as to lift and lower the auxiliary wheel 7 in the same manner as the lifting and lowering motions of the auxiliary wheel 7 in the moving body 1A of the first embodiment. The movement control of the movement part 2 is the same as that of the first embodiment.

In the moving body 1B of the present embodiment, the same effect as that of the first embodiment is able to be achieved.

Third Embodiment

Figure 12:
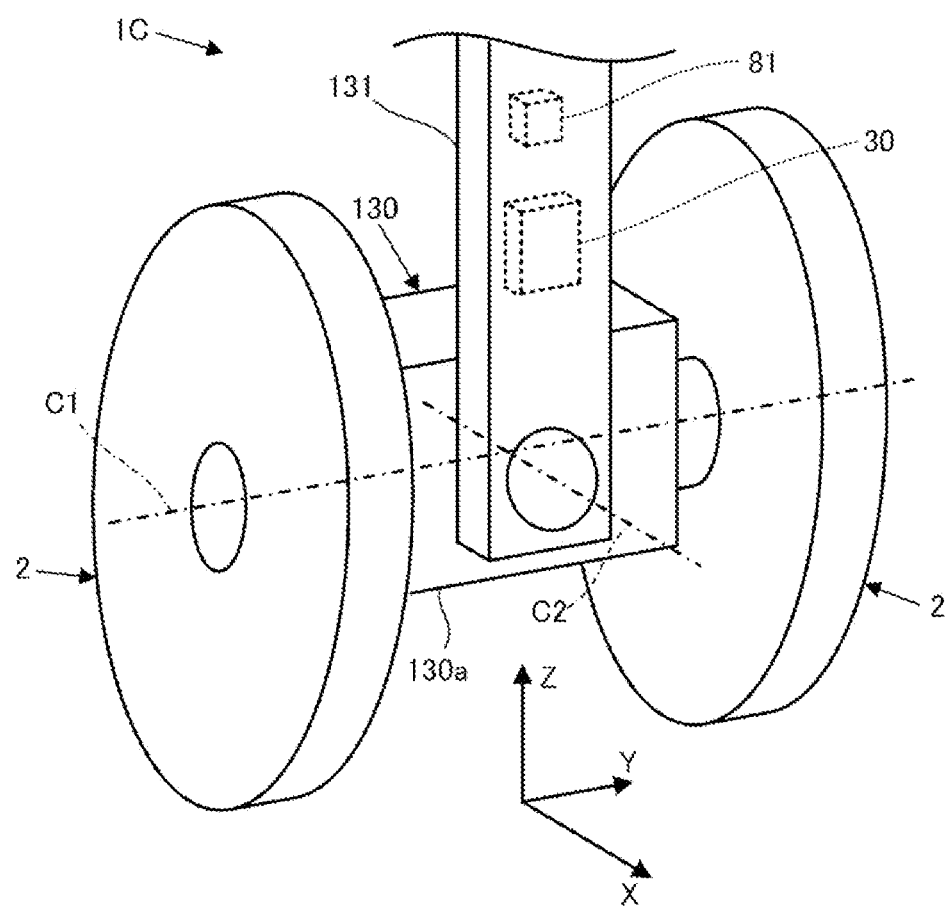
FIG. 12 is a perspective view showing a configuration of principal parts of a moving body of a third embodiment of the disclosure.

A moving body of the disclosure may include multiple movement parts. For example, FIG. 12 illustrates a moving body 1C including two movement parts 2 each having the same structure as the movement part 2 of the moving body 1A of the first embodiment. The moving body 1C has, for example, the same structure as a moving body described in a fourth embodiment of Patent Document 1. In FIG. 12, the same components as those of the moving body 1A of the first embodiment are denoted by the same reference numerals as those of the moving body 1A.

In the moving body 1C, the two movement parts 2 and 2 are disposed side by side in the left-right direction (Y-axis direction). In this case, a parallel direction (Y-axis direction) of the movement parts 2 and 2 is a direction of a rotation axis C1 of a rotary motion of each of the movement parts 2 and 2. In FIG. 12, each movement part 2 is schematically shown to have a wheel-like shape.

A driving mechanism unit 130 driving each of the movement parts 2 and 2 is assembled between the movement parts 2 and 2. In the driving mechanism unit 130, a driving mechanism having the same configuration as that of the driving mechanism 21 of the moving body 1A of the first embodiment is mounted for each movement part 2. An exterior 130a of the driving mechanism unit 130 is rotatable about the rotation axis C1 of the rotary motion of the movement parts 2 and 2.

On the exterior 130a of the driving mechanism unit 130, a base 131 is axially supported to be swingable about an axis C2 in the front-rear direction (X-axis direction). Accordingly, the base 131 is inclinable about both the axes C1 and C2 with respect to the floor to which the movement parts 2 and 2 are grounded.

The base 131 extends upward from an attachment part with respect to the exterior 130a. Although not illustrated in FIG. 12, the passenger seat 6 is connected to an upper part of the base 131 via, for example, a connecting mechanism having the same configuration as the connecting mechanism 4 described in the first embodiment or the connecting mechanism 5 described in the second embodiment. In addition, the auxiliary wheel 7 (not shown) as the auxiliary grounding part is connected to the passenger seat 6 similarly to, for example, the first embodiment or the second embodiment.

Further, the inclination sensor 81 and the control device 30 are mounted on the base 131. The control device 30 may be mounted on the driving mechanism unit 130.

In this case, in the processing of the movement control of each movement part 2 by the control device 30, the target translational velocity Vw_cmd_xy of the movement parts 2 and 2 as a whole is determined by the same control processing as that of the movement controller 30a described in the first embodiment. However, in this case, a set value of the height of the overall center of gravity from a swing fulcrum (the axis C2) of the base 131 with respect to the driving mechanism unit 130 is used as the value of h in Equations (1b), (2b), (3b) (or (3b)') related to movement of the moving body 1C in the Y-axis direction, and the value of r_y is set to zero.

Further, for example, according to the estimated value Vb_estm_y of the transitional velocity (center of gravity translational velocity) of the overall center of gravity of the moving body 1C in the Y-axis direction, or according to an operation by the operation part 82, a target turning velocity (target angular velocity in the yaw direction) of the moving body 1C is determined.

A target translational velocity of each of the movement parts 2 and 2 in the X-axis direction is determined so that an average value of the target translational velocity of each of the movement parts 2 and 2 in the X-axis direction matches the target translational velocity Vw_cmd_x of the movement parts 2 and 2 as a whole in the X-axis direction, and that a target turning velocity is realized according to a difference in the target translational velocity in the X-axis direction between the movement parts 2 and 2 (for example, so that an angular velocity in the yaw direction obtained by dividing the difference in the target translational velocity in the X-axis direction by a space between the movement parts 2 and 2 in the Y-axis direction matches the target turning velocity).

A target translational velocity Vw_cmd_y of the movement parts 2 and 2 as a whole in the Y-axis direction is determined as the target translational velocity of each of the movement parts 2 and 2 in the Y-axis direction. Operation of the moving actuators 22a and 22b is controlled for each of the movement parts 2 and 2 so as to realize the target translational velocity of each of the movement parts 2 and 2. In this case, a method for controlling operation of the moving actuators 22a and 22b for each movement part 2 may be the same as that of the movement control of the movement part 2 in the first embodiment.

The lifting and lowering of the passenger seat 6 or the auxiliary wheel 7 with respect to the base 131 are controlled in the same manner as in the first embodiment or the second embodiment.

The moving body 1C of the present embodiment may be the same as that of the first embodiment or the second embodiment except for the matters described above. By the moving body 1C of the present embodiment, the same effect as that of the first embodiment is able to be achieved. During movement of the moving body 1C of the present embodiment, while the movement parts 2 and 2 are not inclined with respect to the floor, the base 131 is inclined with respect to the floor according to a weight shift of the passenger P or the like, similarly to each of the above embodiments. According to this inclination, the movement parts 2 and 2 move on the floor.

Fourth Embodiment

Figure 13:
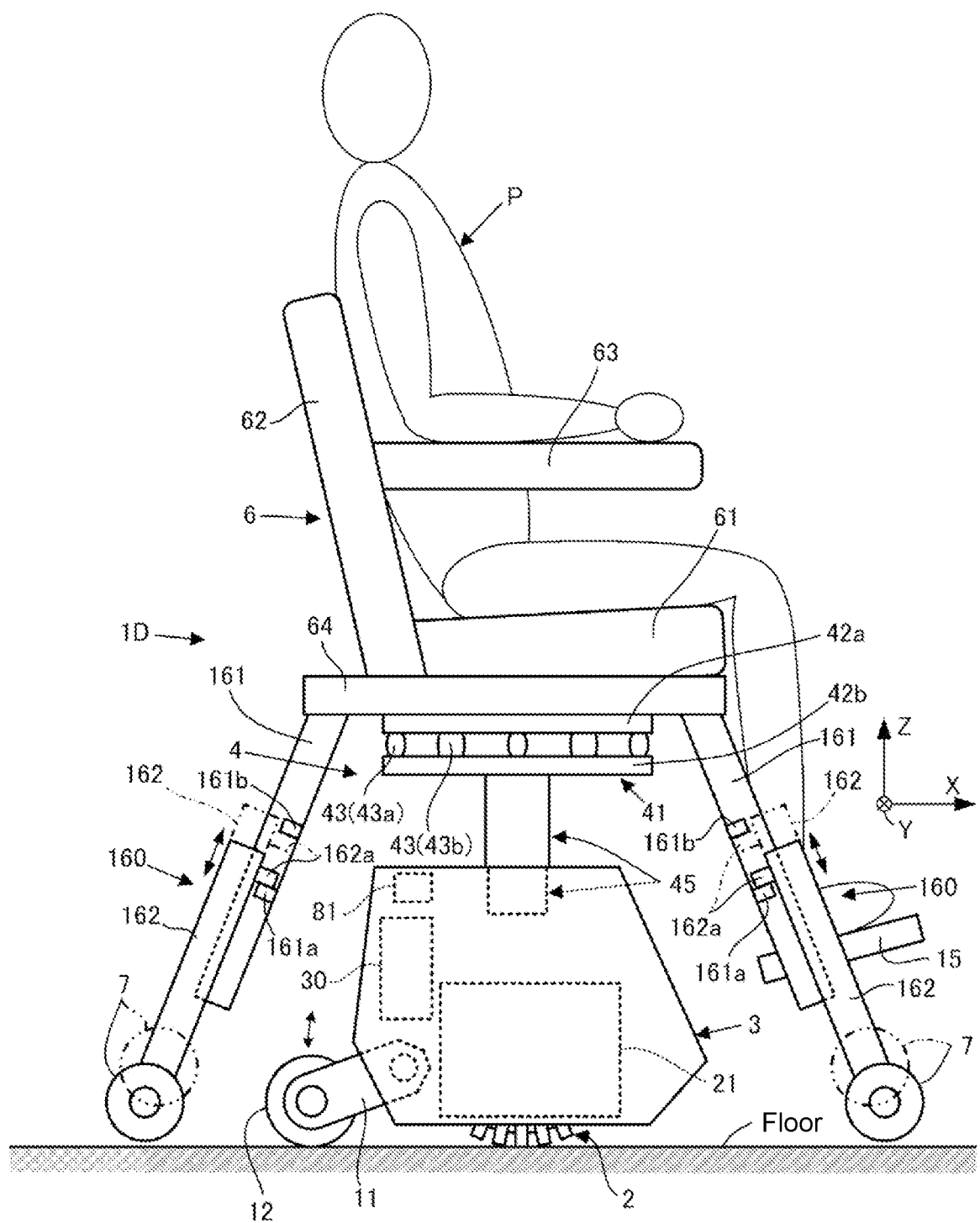
FIG. 13 is a side view showing a moving body of a fourth embodiment of the disclosure.

In the first embodiment, the height of each auxiliary wheel 7 (auxiliary grounding part) with respect to the passenger seat 6 is fixed. However, for example, as in a moving body 1D illustrated in FIG. 13, each auxiliary wheel 7 (auxiliary grounding part) may be connected to the passenger seat 6 so as to have a section (so-called play) allowing free upward and downward movement with respect to the passenger seat 6. The moving body 1D has, for example, the same structure as a moving body described in a sixth embodiment of Patent Document 1. In FIG. 13, the same components as those of the moving body 1A of the first embodiment are denoted by the same reference numerals as those of the moving body 1A.

In the moving body 1D, each leg 160 connecting each auxiliary wheel 7 to the passenger seat 6 is divided into an upper leg 161 and a lower leg 162. An upper end of the upper leg 161 is fixed to the seat frame 64 of the passenger seat 6.

The lower leg 162 is engaged with the upper leg 161 so as to be freely slidable within a predetermined section along an extension direction (obliquely up-down direction) of the upper leg 161. The auxiliary wheel 7 is attached to a lower end of the lower leg 162 similarly to the first embodiment. Accordingly, each auxiliary wheel 7 is connected to the passenger seat 6 via the leg 160 so as to have a play in the predetermined section.

In the leg 160 of the illustrated example, the play section (in other words, the play section for sliding of the lower leg 162 with respect to the upper leg 161) of each auxiliary wheel 7 with respect to the passenger seat 6 is, for example, a section between a lower end position where a contact part 162a fixed to the lower leg 162 contacts a stopper 161a fixed to a lower side of the upper leg 161 as shown in solid lines and an upper end position where the contact part 162a contacts a stopper 161b fixed to an upper side of the upper leg 161 as shown in chain double-dashed lines.

The configuration of the moving body 1D of the present embodiment is the same as that of the moving body 1A of the first embodiment except for the matters described above.

In the moving body 1D, the movement control of the movement part 2 by the control device 30 and the control of lifting and lowering of the passenger seat 6 with respect to the base 3 are performed similarly to the first embodiment. However, in the present embodiment, the lowering of the passenger seat 6 with respect to the base 3 is performed until a state is reached in which each auxiliary wheel 7 is grounded to the floor and the contact part 162a of each leg 160 contacts the upper stopper 161b (and until a state is reached in which each auxiliary wheel 7 is able to receive a ground load supporting the passenger seat 6).

In the present embodiment, such a state in which each auxiliary wheel 7 is grounded to the floor and the contact part 162a of each leg 160 contacts the upper stopper 161b corresponds to the auxiliary wheel grounded state in the first embodiment. The state as shown in FIG. 13 in which the passenger seat 6 is lifted with respect to the base 3 and the contact part 162a of each leg 160 is separated downward from the upper stopper 161b by gravity corresponds to the auxiliary wheel non-grounded state in the first embodiment.

In the present embodiment, the same effect as that of the moving body 1A of the first embodiment is able to be achieved.

Other Embodiments

In the moving body of the disclosure, the configuration of the connecting mechanism connecting the passenger seat to the base is not limited to that shown in the first embodiment or the second embodiment, and various configurations may be adopted. For example, as the connecting mechanism, one having a configuration described in a third embodiment or a fifth embodiment of Patent Document 1 may be adopted.

In addition, the movement part of the moving body of the disclosure is not limited to one movable in all directions on the floor, and may be, for example, one movable only in one direction (such as the front-rear direction). The movement part may be composed of, for example, two wheels parallel to each other in the axle direction. The two wheels may be driven so as to move the moving body straight forward and rearward according to inclination (inclination in the direction about an axis in the left-right direction) of the base in the front-rear direction, and may be driven (by causing a speed difference between the two wheels) so as to turn the moving body around according to inclination (inclination in the direction about an axis in the front-rear direction) of the base in the left-right direction.

The moving body of the disclosure is not limited to the one including multiple auxiliary wheels as the auxiliary grounding part. For example, the auxiliary grounding part may be configured (for example, to have a ski-like shape) to slide with respect to the floor when grounded to the floor. In addition, for example, a skirt-like cover member may extend downward from a peripheral edge of the passenger seat 6, and multiple auxiliary grounding parts may be attached to or formed at a lower end of the cover member.

What is claimed is:

1. A moving body, comprising:
   a movement part movable on a floor;
   a base assembled to the movement part so as to be inclinable with respect to the floor;
   a passenger seat attached to the base so as to be elastically swingable with respect to the base;
   an auxiliary grounding part, connected to the passenger seat so as to be able to be lifted and lowered with respect to the base, and connected to the passenger seat so that a ground load supporting the passenger seat acts from the floor with the auxiliary grounding part lowered to a predetermined position with respect to the base, and the ground load is eliminated according to lifting of the passenger seat from the predetermined position with respect to the base;
   a moving actuator generating a driving force that moves the movement part;
   a lifting actuator generating a driving force that lifts and lowers the auxiliary grounding part with respect to the base; and
   a control device, having a function of controlling movement of the movement part via the moving actuator and a function of controlling lifting and lowering of the auxiliary grounding part with respect to the base via the lifting actuator, wherein
   the control device is configured to, when starting movement control of the movement part, start a first control processing that moves the movement part by the moving actuator so that a posture of the base with respect to the passenger seat becomes a predetermined posture with the auxiliary grounding part lowered to the predetermined position, and then start a second control processing that lifts the auxiliary grounding part with respect to the base by the lifting actuator and a third control processing that moves the movement part by the moving actuator so as to stabilize a posture of the passenger seat after a delay from the start of the first control processing.

2. The moving body according to claim 1, wherein the control device is configured to execute the third control processing so as to gradually increase an absolute value of a control gain in the third control processing.

3. The moving body according to claim 1, wherein the third control processing is a control that moves the movement part so that a velocity of an overall center of gravity of the moving body and an inclination angle of the base approach their respective target values, wherein the control device is configured to, when executing the second control processing and the third control processing, set the target value of the velocity of the overall center of gravity to zero and execute the third control processing until lifting of the passenger seat with respect to the base is completed.

4. The moving body according to claim 1, wherein the control device is configured to, when ending the movement control of the movement part, execute a fourth control processing that lowers the auxiliary grounding part to the predetermined position with respect to the base by the lifting actuator while executing the third control processing, and gradually reduce an absolute value of a control gain in the third control processing before the auxiliary grounding part is lowered to the predetermined position with respect to the base by the lifting actuator.

5. The moving body according to claim 2, wherein the third control processing is a control that moves the movement part so that a velocity of an overall center of gravity of the moving body and an inclination angle of the base approach their respective target values, wherein the control device is configured to, when executing the second control processing and the third control processing, set the target value of the velocity of the overall center of gravity to zero and execute the third control processing until lifting of the passenger seat with respect to the base is completed.

6. The moving body according to claim 2, wherein the control device is configured to, when ending the movement control of the movement part, execute a fourth control processing that lowers the auxiliary grounding part to the predetermined position with respect to the base by the lifting actuator while executing the third control processing, and gradually reduce the absolute value of the control gain in the third control processing before the auxiliary grounding part is lowered to the predetermined position with respect to the base by the lifting actuator.

7. The moving body according to claim 3, wherein the control device is configured to, when ending the movement control of the movement part, execute a fourth control processing that lowers the auxiliary grounding part to the predetermined position with respect to the base by the lifting actuator while executing the third control processing, and gradually reduce an absolute value of a control gain in the third control processing before the auxiliary grounding part is lowered to the predetermined position with respect to the base by the lifting actuator.

8. The moving body according to claim 5, wherein the control device is configured to, when ending the movement control of the movement part, execute a fourth control processing that lowers the auxiliary grounding part to the predetermined position with respect to the base by the lifting actuator while executing the third control processing, and gradually reduce an absolute value of a control gain in the third control processing before the auxiliary grounding part is lowered to the predetermined position with respect to the base by the lifting actuator.

* * * * *